CARTONER

Filed Dec. 8, 1965 19 Sheets-Sheet 1

INVENTORS
ADRIAN C. MIZELLE
ROBERT D. GILLESPIE
BY
Kane, Dalsimer, Kane & Smith
ATTORNEYS Oct. 15, 1968 A. C. MIZELLE ET AL 3,405,503

CARTONER

Filed Dec. 8, 1965 19 Sheets-Sheet 2

INVENTORS
ADRIAN C. MIZELLE
ROBERT D. GILLESPIE
BY
Kane, Dalsimer, Kane & Smith
ATTORNEYS

CARTONER

Filed Dec. 8, 1965 19 Sheets-Sheet 3

INVENTORS
ADRIAN C. MIZELLE
ROBERT D. GILLESPIE
BY
Kane, Dalsimer, Kane & Smith
ATTORNEYS Oct. 15, 1968 A. C. MIZELLE ET AL 3,405,503

CARTONER

Filed Dec. 8, 1965 19 Sheets-Sheet 4

INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS

22 FIG. 21

INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS Oct. 15, 1968 A. C. MIZELLE ET AL 3,405,503

CARTONER

Filed Dec. 8, 1965 19 Sheets-Sheet 13

INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS Oct. 15, 1968 A. C. MIZELLE ET AL 3,405,503

CARTONER

Filed Dec. 8, 1965 19 Sheets-Sheet 16

INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS INVENTORS
ADRIAN C. MIZELLE
ROBERT D. GILLESPIE
BY
Kane, Dalsimer, Kane & Smith
ATTORNEYS

CARTONER

INVENTORS
ADRIAN C. MIZELLE
ROBERT D. GILLESPIE
BY
Kane, Dalsimer, Kane & Smith
ATTORNEYS United States Patent Office 3,405,503

Patented Oct. 15, 1968

3,405,503

CARTONER

Adrian C. Mizelle and Robert D. Gillespie, Petersburg, Va., assignors to Brown and Williamson Tobacco Corporation, Louisville, Ky., a corporation of Delaware Filed Dec. 8, 1965, Ser. No. 512,382

13 Claims. (Cl. 53—53)

ABSTRACT OF THE DISCLOSURE

A cartoning machine is provided for enclosing two rows of five packages of cigarettes each in a carton blank. A hopper on the machine chassis supports a plurality of substantially flat carton blanks in stacked relationship. A blank feeder serves to feed one blank at a time from the hopper to a location at which packages of cigarettes are adapted to be assembled therewith. A support is provided at this location for supporting the blank until the selected number of packages are collected for assembly therewith. A feeding mechanism for wrapped cigarette packages serves to collect the selected number of packages for assembly with the blank. An elevator operates to arrange the packages in superimposed rows at an elevated position; and a support cooperates in supporting the elevated rows of packages. A plunger mechanism moves the top two rows of the packages into engagement with the supported carton blank; and moves the blank and two rows of packages horizontally to a first station at which the blank is partially enclosed about the packages. A folding mechanism cooperates with the blank moving from the initial assembly location to the first station such that the blank has a leading panel over the forward end of the two rows of packages and top and bottom panels over the respective top face of the top row and the bottom face of the bottom row together with bottom end flaps over part of the ends of the two rows. At the first station, the blank will have extending trailing top and bottom flaps and top end flaps. A pasting means is so located as to apply a pattern of paste to one of the trailing flaps prior to the folding of these flaps. A flap-folding means serves to fold these trailing flaps with the pattern of paste therebetween. This folding mechanism includes a pair of vertically reciprocal folding plates shiftable in a linear path away from the extending trailing flaps into engagement therewith to fold the flaps upon one another. These plates are adapted to remain in engagement with the folded flaps until another carton blank with partially enclosed packages are moved by the plunger from the initial assembly location to the first station. When this occurs, the plates are reciprocated away from the folded trailing flaps to permit the flaps to be engaged directly by the leading panel of the subsequent blank. The end flaps then have paste applied thereto following which a folding mechanism completes the folding of the carton by securing the end flaps to one another. The blanks and enclosed packages are directed along a substantially linear path from the initial assembly location to the discharge end of the cartoning machine.

The present invention relates to a cartoning machine for assembling and wrapping a predetermined number of cellophane wrapped cigarette packages in a carton blank in an automatic and efficient manner and, more particularly, an improved machinery construction for such purposes.

It has been common practice to place ten wrapped cigarette packages in a carton for commercial distribution and eventual public purchase and consumption of the contained cigarettes. In the cigarette manufacturing industry it has long been the practice to partially form a carton from a blank with side flaps open whereupon an operator would then manually place the requisite number of ten cigarette packages in the partially formed blank. The open flap would then be closed to provide a completed carton of ten cigarette packages.

Several attempts have been made at machinery for automatically receiving and grouping the cigarette packages and then assembling them with a carton blank when in one of various stages of folding or completion. However, these prior art attempts have left much to be desired both in productivity and efficiency as well as reliability of operation particularly over prolonged periods of time.

With the foregoing in mind, it is a principal object of this invention to provide an improved cartoning machine for placing a predetermined number of cigarette packages in a carton wherein the packages and carton blanks are individually and automatically fed to an assembly station whereupon the blank is automatically wrapped around the packages to provide enclosure therefor that is readily opened for state tax stamp application then resealed for subsequent distribution to the consuming public.

Another object is to provide a machine of this type in which a substantial saving in labor is realized by minimizing, if not eliminating, the requisite amount of attendant personnel between the stage at which a cigarette package is wrapped and the placement thereof in carton, while realizing increased productivity coupled with optimum reliability and performance over prolonged periods of time.

A further object is to provide a machine of this type in which automatic folding and pasting of the carton blank is accomplished together with automatic code and date stamping thereof thereby further automating the requisite number of steps performed during the manufacturing process between cigarette wrapping and cartoning.

Briefly stated, the cartoning machine of this invention embraces a table support having an assembly station at which the selected number of packages of cigarettes, ordinarily taken to be ten, are forced into a carton blank through the actuation of a horizontally reciprocal plunger. A blank hopper or magazine station automatically stacks and permits feeding of individual blanks in a predetermined manner and sequence to the assembly station. The packages, on the other hand, are automatically received from the cellophane wrapping machines and conveyed to the cartoner. In order to maintain the cartoner operational at optimum efficiency, a sufficient collation of packages are available for feeding into the carton. An automatically actuated elevator assembly serves to sequentially elevate five packages at a time so that eventually fifteen packages in horizontal rows of five, five packages on top of another, are poised and determinative of the operation of the horizontally reciprocal plunger. This action of the plunger initiates the folding of the carton blank whereby the leading ends and the uppermost face as well as the bottom face are embraced by the initial fold of the blank. The forward as well as lower end flaps of the carton are also folded at this time as the packages and partially folded carton blank are placed at the first plunge station at which glue or paste is applied to the exterior of the trailing side bottom flap. The trailing side lower flap is folded upwardly and the trailing side top flap is folded downwardly to thereby cause the flaps to overlap and be adhered to one by the applied paste. The partially wrapped packages are then moved to the second plunge station upon the next reciprocation of the plunger assembly. While at this station and during retraction of the plunger, paste is applied to the interior of the top end flaps. Thereafter, the leading partially enclosed packages are moved to the third plunge station at which the top end flaps are folded downwardly to place the end flaps in contact with one another in a secure manner by means of the interposed adhesive. The completely wrapped packages of cigarettes are then fed to the discharge station upon a predetermined number of reciprocations of the plunger assembly whereupon a predetermined number of cartons are placed in boxes for commercial shipment. Prior to this and in timed relation with the movement of the cartons, a date and code stamp is applied to the ends of the carton.

Numerous other objects and advantages will become apparent from the following detailed description which is to be taken in conjunction with the accompanying drawings illustrating a somewhat preferred embodiment of the invention and in which.

Figures 34, 35, 36:
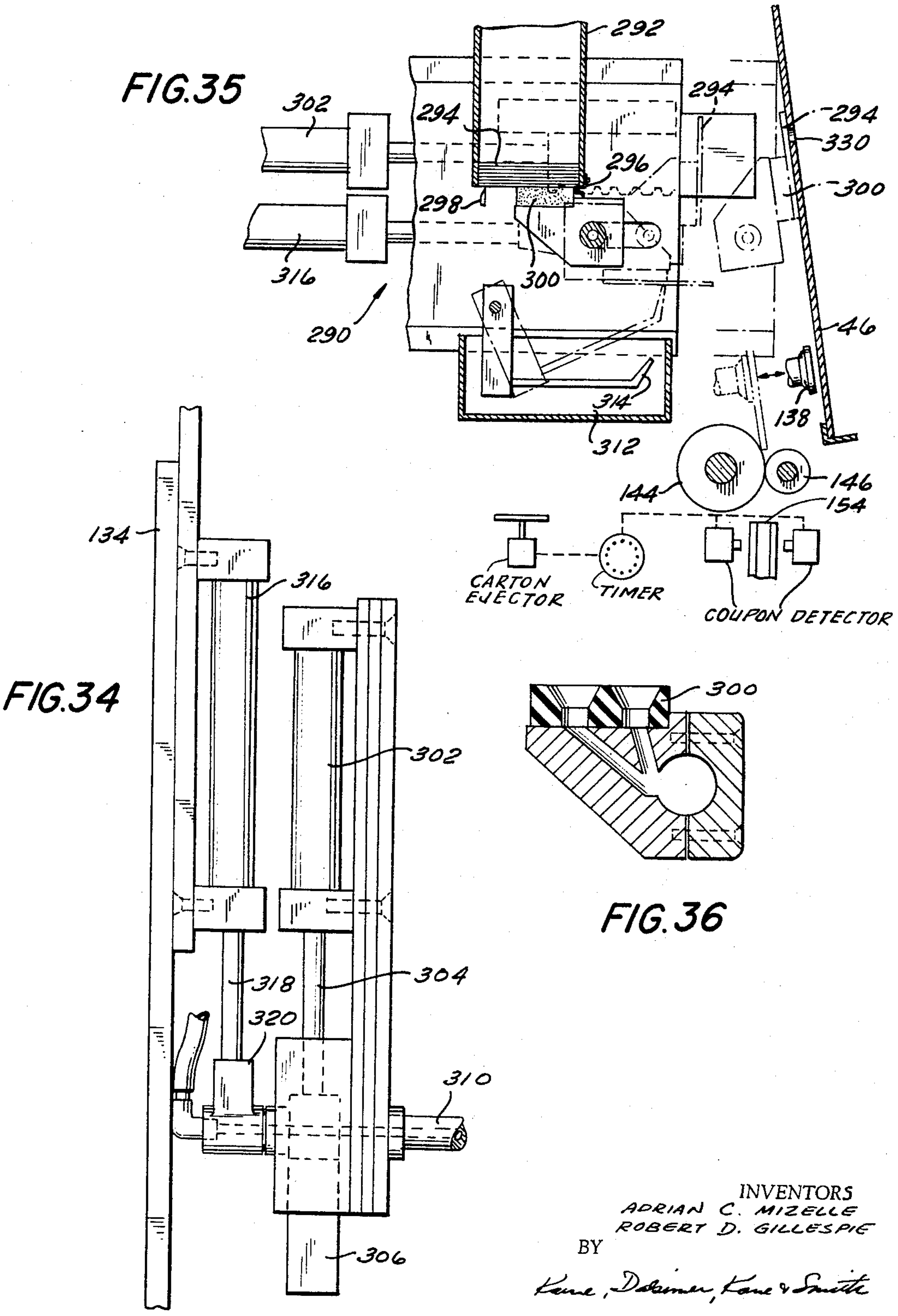
FIG. 34 is a sectional view taken along the line 34—34 of FIG. 32.

FIG. 35 is a fragmentary sectional view through the coupon hopper and feed assembly showing the manner in which the individual coupons are stacked and then fed into association with the carton blanks, with a missing coupon detection and ejection system shown diagrammatically as an optional accessory to the cartoning machine; and FIG. 36 is an enlarged cross-sectional view of the vacuum pick-up employed in the coupon feeding assembly.

GENERAL DESCRIPTION

In the drawings, a cartoning machine 40, incorporating the teachings of this invention, is illustrated and is supported primarily by means of the table or chassis 42. The machine 40 includes a carton blank stacking and feeding station 44 adapted to mount a plurality of upwardly extending and slightly inclined stacked carton blanks 46. The mechanism at the discharge end of this station 44 cooperated in feeding a single blank at a time along a downwardly transcending path to an assembly station 48 at which the lowered blank 46 is adapted to receive two stacked rows of five packages each of wrapped cigarette packages 50. These packages originate from a cigarette package feeding station 52 adapted to have a sufficient number of wrapped cigarette packages ready for feeding into the assembly station 48. The package feeding station 52 may be conveniently coupled with the discharge end of one or more cigarette packaging-wrapping lines adapted to package cigarettes and wrap the individual packages in cellophane. An interposed conveyor network may form this connection and may be in the nature of a pneumatic conveying system. The packages 50 are fed in a continuous stream into the machine 40 whereupon an elevator assembly 54 elevates five packages at a time. Two more rows of five are eventually similarly elevated to raise the previous row whereupon a horizontally reciprocal plunger assembly 56 drives the top two rows of ten packages of cigarettes into the lowered carton blank 46 at the assembly station 48. This plunger assembly continues to move the group of ten packages 50, together with the lowered blank 46 from the assembly station 48 to the first plunge or carton folding station 58 at which the carton is folded over the top and bottom faces of the group of packages 50 such that the forward end of the group is covered by the forward end panel 60, the top of the group is covered by the top panel 62 and the bottom of the group is covered by the bottom panel 64 of the carton 46 while, at the same time, the opposed bottom end flaps 66 are folded upwardly together with the forward opposed end flaps 67. Further movement of this partially enclosed group of ten packages to the next plunge station is dictated by the feeding of another assembled group of packages and lowered blank into folding station 58. A predetermined pattern of adhesive is now applied to the underside of the trailing side bottom flap 68. The trailing side bottom flap 68 is then folded upwardly and the trailing top side flap 70 is subsequently folded downwardly upon the exterior of the upwardly folded trailing side bottom flap 68 and secured thereto by the interposed adhesive. This sequence of flap pasting and folding is accomplished, respectively, by the trailing side bottom flap paster 74, the trailing side bottom flap folder mechanism 72, and the trailing side top flap folder 76. Thereafter the packages and blank are moved to the second plunge station. During the retraction of the plunger, a predetermined pattern of adhesive is applied to the under face of top end flaps 80 by the paster 82. The continued movement of the plunger assembly 56 will eventually place the partially enclosed carton at the third plunge or top end flap folding station 78. At this station, the end flap 80 will be folded downwardly upon the lower end flap 66 by the top end flap folder mechanism 84. Further movement of the entirely wrapped group of cigarette packages will be dictated by the next reciprocal movement of the plunger assembly 56 to feed another assembled group of cigarette packages 50 and carton blank 46 from the assembly station 48. In accordance with the disclosed embodiment, a number of such plunger reciprocations will place the totally wrapped group of packages in the folded carton 86 at the code and date applying station 88 at which the selected code and date are stamped at both ends of the carton by a pair of opposed and cooperating marking mechanisms 90 and 92. Thereafter the completed carton 86 of cigarettes may be automatically or manually placed into boxes for eventual commercial shipment.

*Carton blank stacking*

Figures 12, 13:
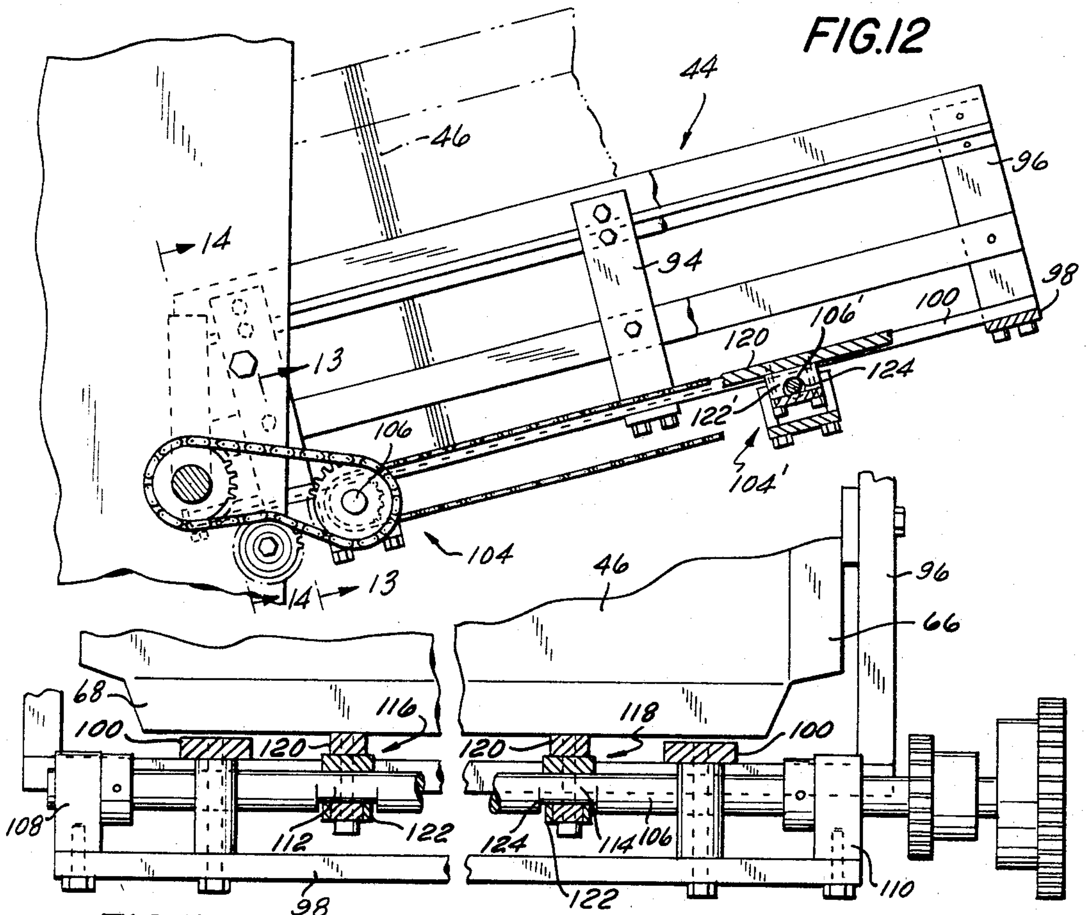
FIG. 12 is an enlarged fragmentary elevational view of the carton blank hopper and feeding station.
FIG. 13 is a sectional view taken along the line 13—13 of FIG. 12.
Figure 14:
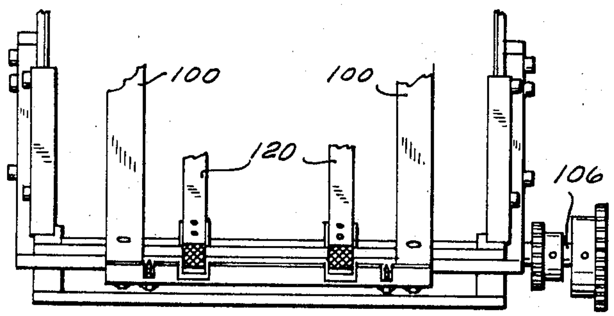
FIG. 14 is a sectional view taken along the line 14—14 of FIG. 12.

Reference is now made to the blank hopper and feed station 44 at which the blanks 46 are vertically stacked and then individually fed downwardly to the assembly station 48. At this station, a blank stacker frame is present comprised of a pair of vertically extending and spaced frame members 94 and 96 both disposed at an incline downwardly towards the assembly station 48. These members extend upwardly from a supporting base structure 98 which comprises three base strips 100. The forwardmost blank 46 is adapted to be disposed in an inclined position together with the remaining stacked blanks and have its top forward face resting against the horizontally extending rod 102. This stacked relationship is adapted to be maintained and the blanks are adapted to travel forwardly during dispensing of the individual blanks by means of the agitation assembly 104. In essence, this assembly is comprised of rotatably driven shaft 106 journaled between bearings 108 and 110. The shaft 106 is provided with a pair of spaced reduced circular sections 112 and 114 having axes eccentrically disposed with respect to the main longitudinal axis of the shaft 106. A similar shaft 106' having similar reduced sections extends between bearings 108' and 110' and is similarly rotatably driven. A pair of spaced agitator bar assemblies 116 and 118 rest on the reduced sections of the shafts 106 and 106'. Each of these agitator assemblies includes a bar 120 from which depends arms 122 having openings 124 which receive the reduced shaft sections. Thus, assuming a counterclockwise rotation of the shafts 106 and 106', as viewed in FIG. 12, the agitator bar assemblies are adapted to be elevated to a high point slightly above the base plates 100 when the reduced section is disposed uppermost in its path of travel. As the reduced sections are rotated counterclockwise from this point, they will impart a slight longitudinal movement to the bars 120 and, consequently, the carton blanks supported thereon. A complete agitation cycle occurs with each removal of a blank from the hopper assembly 44 to assure proper carton blank arrangement in the hopper assembly 44.

*Carton blank feed*

The removal of the forwardmost blank 46 from the hopper assembly 44 is accomplished at predetermined intervals and particularly during the latter part of the retraction cycle of the plunger assembly 56, by means of the cooperating pair of identical suction cup assemblies 126 and 128. Each assembly is keyed to a pivotal shaft 130 extending between a pair of vertically extending plates 132 and 134 forming part of the chassis 42 of the machine. Towards the end, each assembly 126 and 128 includes a downwardly depending arm 136 having supported at its bottom end a suction cup 138. The interior of each cup is coupled with a suction or vacuum source through the tube 140. When shaft 130 is rocked in a counterclockwise direction, as viewed in FIG. 15, the cups 138 will engage with the forwardmost blank 46 and the suction created at this time will cause the blank 46 to move with the cup 138 when pivotally retracted in a clockwise direction. In this manner, the lowermost edge of the blank 46 will override the relatively short upwardly extending flange 142. The suction is thereafter removed and the blank 46 is free to drop under the influence of gravity. Following each reciprocation of the plunger assembly 56, a microswitch 143 is actuated to remove another carton blank 46 from the hopper. The forward movement of the pack plunger assembly 54 through switch 143 deactivates the elevating mechanism 54 preventing elevation of packages that would cause a jamming of the mechanisms, the plunger's return permits the elevator's operation.

The carton blank 46 upon removal from the hopper encounters a supplemental blank feed which includes the stationary rotatable roller 144 and the pivotal knurled roller 146. The ends of the roller 146 are journaled between the plates 132 and 134 on the ends of arms 148 each of which are pivotal on the shaft 150 extending between and journaled in the plates 132 and 134. The other ends of the arm 148 serve as a cam-follower in which the roller 152 is adapted to follow the periphery of cam 153. The rotation of the cam 153 is synchronized with the movement of the suction cup assemblies 124 and 126 such that when they release the removed blank 46, the lower portions of the blank will be grasped between rollers 144 and 146. In this connection, as the forwardmost blank 46 is removed from the hopper assembly 44 by the suction cup assemblies 126 and 128, the cam 153 will urge the roller 146 to pivot clockwise a predetermined amount to place the lower portion of the blank 46 between the separated rolls 144 and 146 and shortly thereafter is grasped therebetween.

This blank will be fed downwardly by the rolls 144 and 146 upon the actuation of switch 155 at the end of the forward stroke of plunger assembly 56. These rolls will feed the blank between a pair of upstanding slotted guides 154 and 156 secured to the respective plates 132 and 134. Eventually the blank 46 will be released from the rolls 144 and 146 and suitably guided downwardly to ultimately come to rest on the stationary platform 158.

Figure 15:
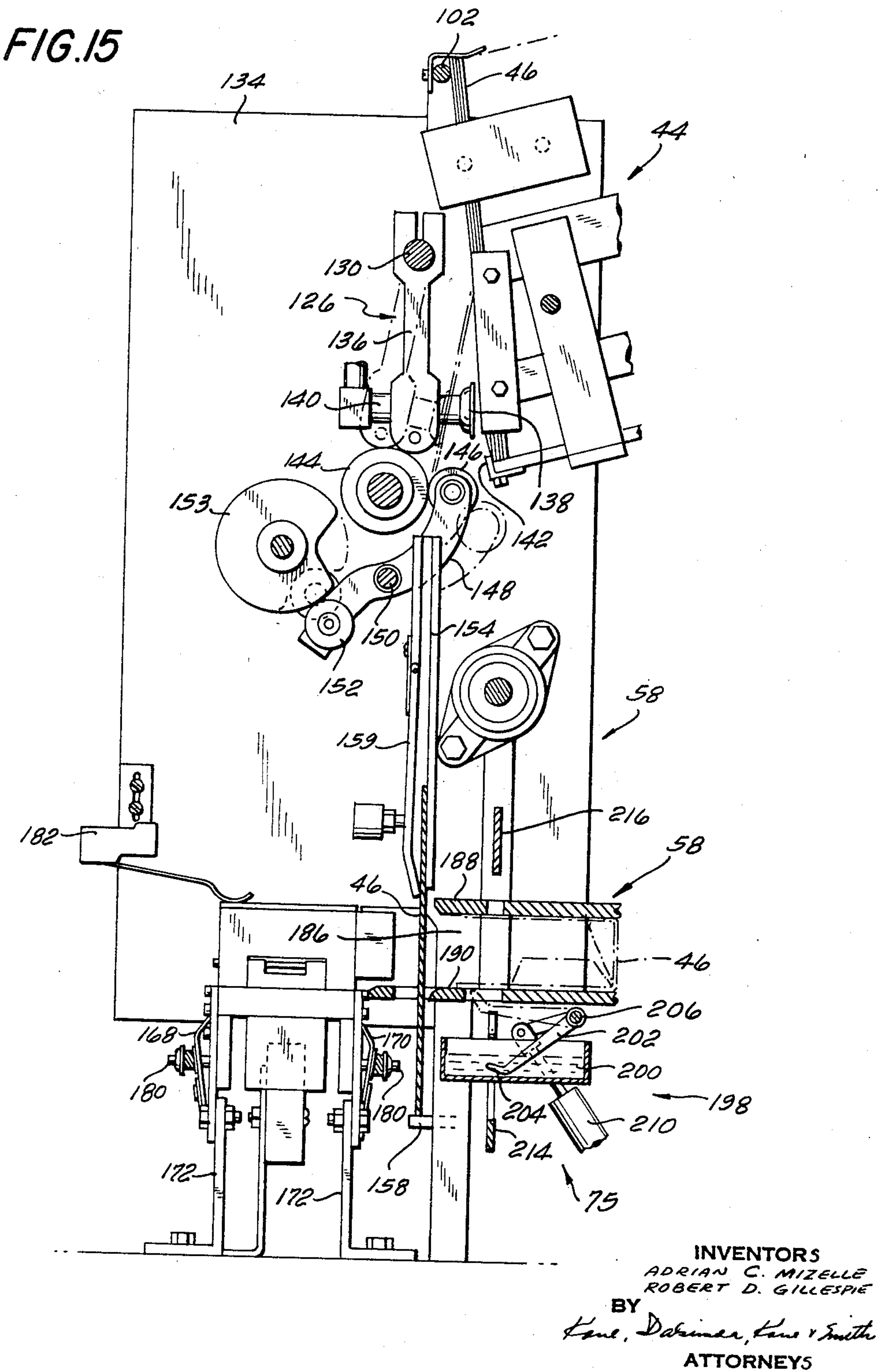
FIG. 15 is an enlarged sectional view through the carton blank and cigarette package assembly station showing the lowering of the carton blank downwardly into position poised and ready to receive the ten packages of cigarettes forced into the blank by means of a reciprocation of the plunger assembly.

The weighted and spring-biased pivotal plate 159 is adapted to pivot clockwise, as viewed in FIG. 15, by the upper portions of the carton blank 46 resting on the support 158 as this portion of the carton folds or bends rearwardly when the leading end of the top folding plate 188 is engaged as the plunger assembly 56 drives the carton blank and ten packages between the upper and lower folding plates 188 and 190, respectively.

*Cigarette package feed*

Referring now to the wrapped cigarette package feeding station 52, it is preferred to maintain a continuous supply of packages for optimum operating conditions of the cartoning machine, and under these circumstances, a build-up of packages 50 will occur on the continuously moving belt conveyor 160. A conveniently located switch 159 may be employed to maintain the elevator assembly 54 temporarily nonoperational until a sufficient number of packages 50 are present for feeding into the cartoning machine 40. Ordinarily, these packages will be received on the conveyor 160 from cigarette packaging and wrapping lines from which cellophane wrapped cigarette packages are discharged. The manner of transporting the packages from the cellophane wrapping machines to the conveyor does not constitute part of this invention but could readily be accomplished by means of a pneumatic conveying system.

Figure 16:
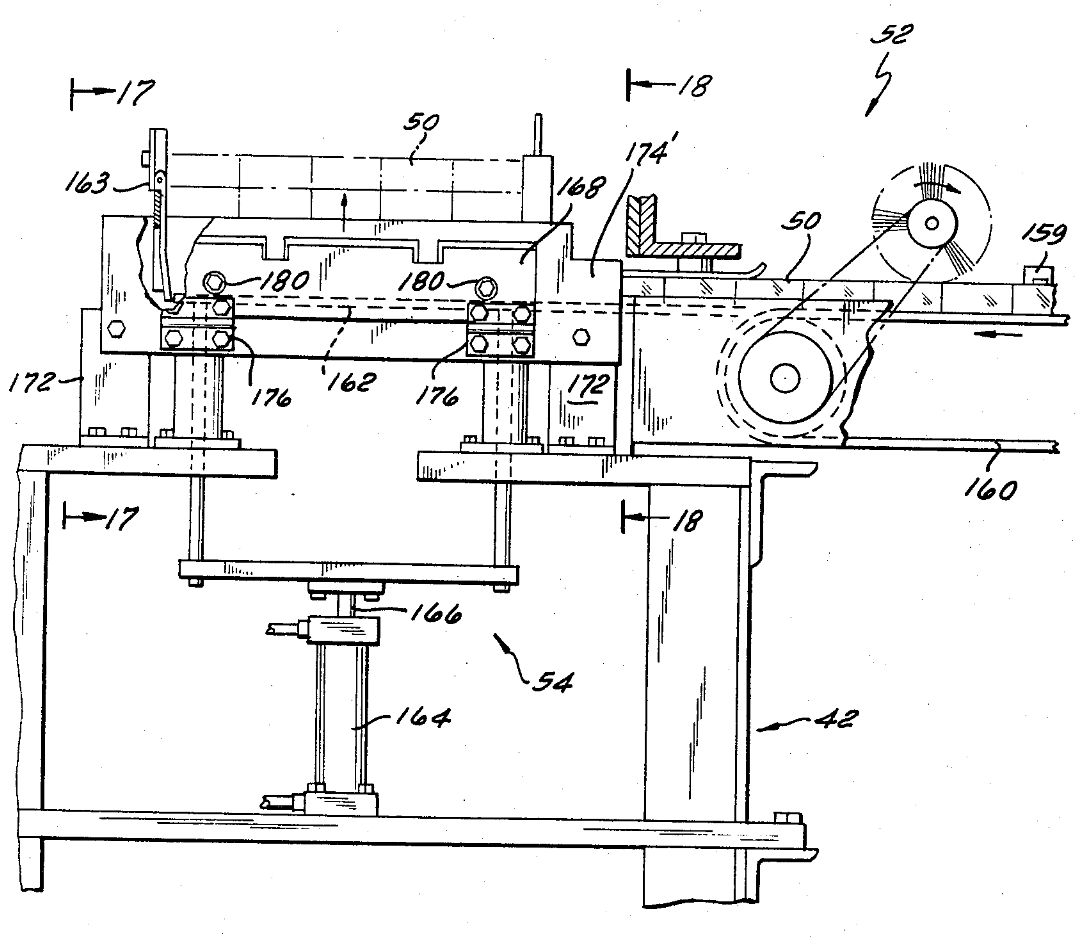
FIG. 16 is an enlarged fragmentary elevational view of the package elevator assembly for elevating rows of five packages each of cigarettes to a position ready to be moved forwardly by the reciprocal plunger.
Figure 17:
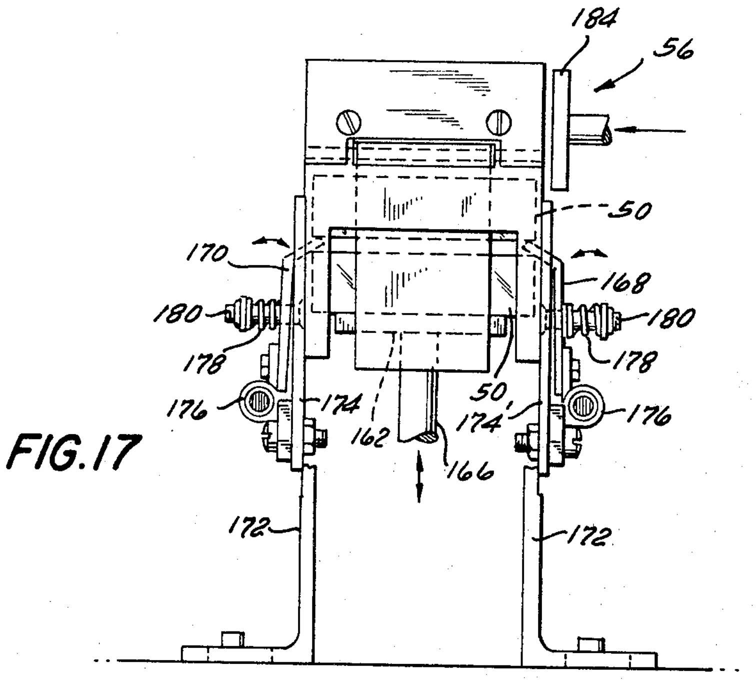
FIG. 17 is a sectional view taken along the line 17—17 of FIG. 16.
Figure 18:
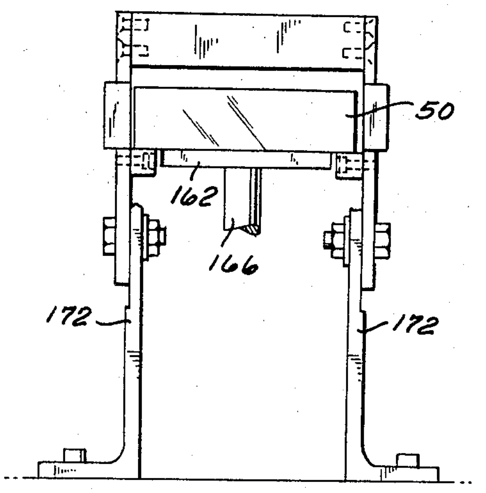
FIG. 18 is a sectional view taken along the line 18—18 of FIG. 16.
Figure 19:
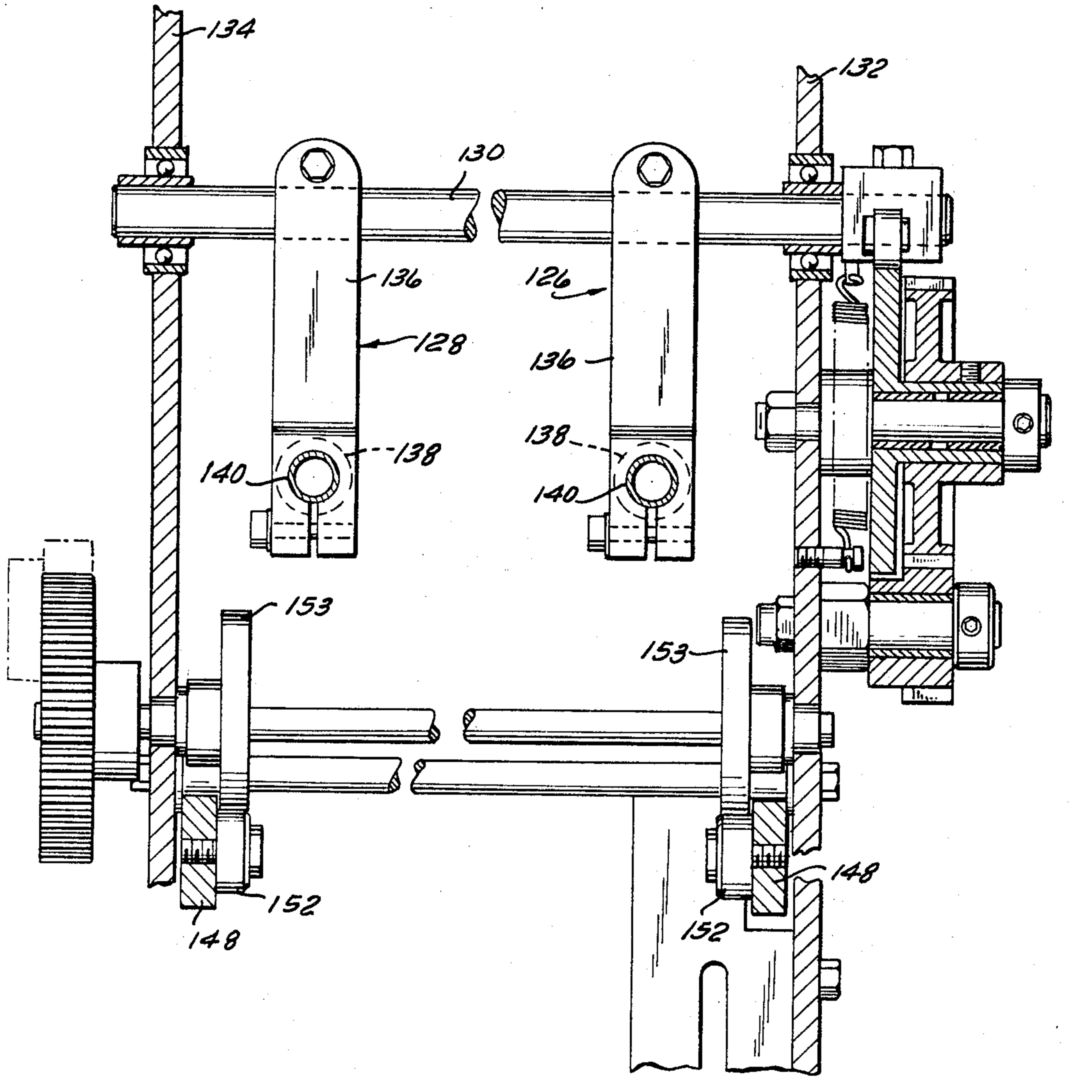
FIG. 19 is a sectional view taken along the line 19—19 of FIG. 1.
Figure 20:
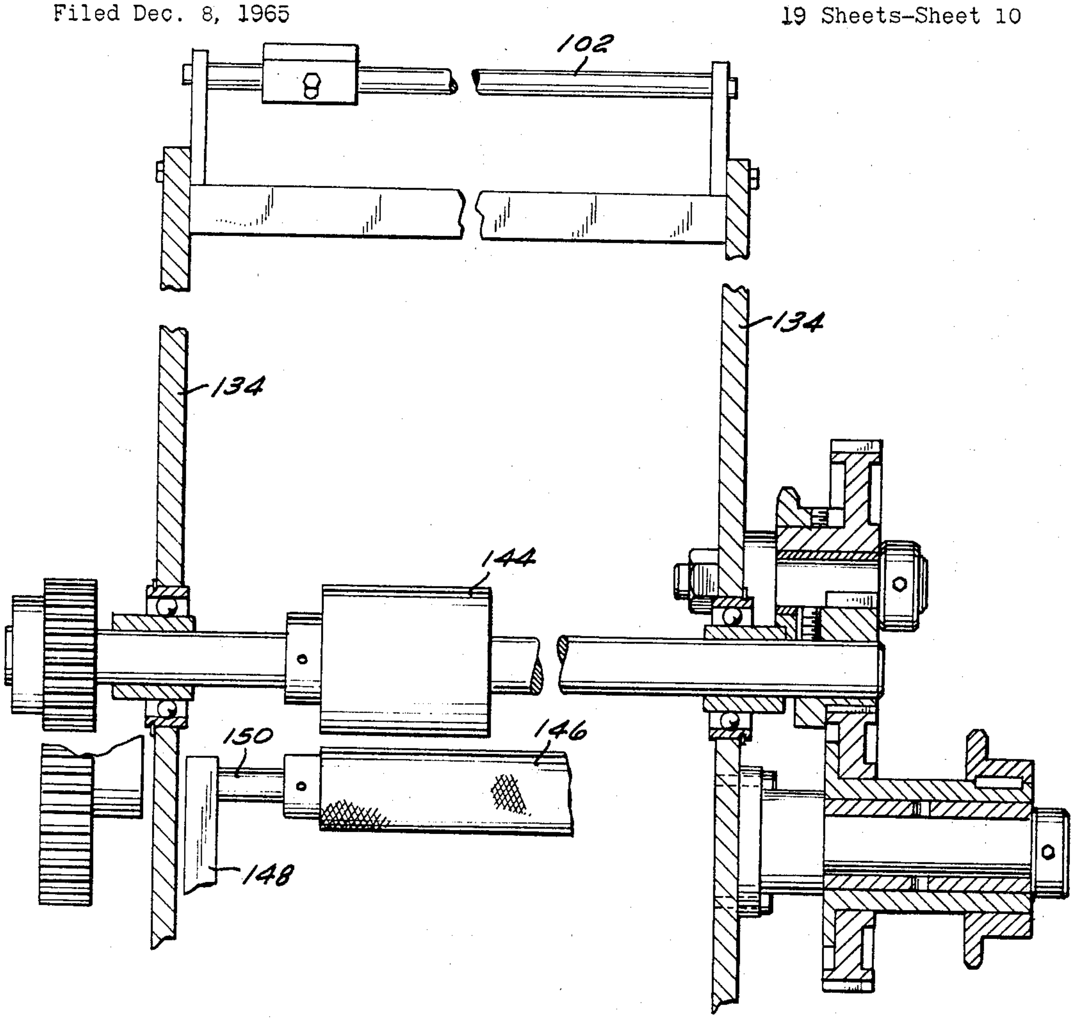
FIG. 20 is a similar sectional view taken along the line 20—20 of FIG. 1.

Thus, the wrapped cigarette package feeding station 52 operates to direct and feed the packages into the cartoning machine 40 and, in accordance with the instant embodiment, five of these packages will be received at a time by the elevator assembly 54. In this connection, the five packages 50 directed onto the elevator platform 162 are elevated as a group upon signal generated upon the actuation of micro-switch 163. The vertical reciprocation of the elevator platform 162 is accomplished by means of the air cylinder 164 from which extends the piston rod 166 coupled directly to the platform 162. Each group of five packages 50 received on the platform 162 are elevated upwardly through and above a pair of outwardly pivotal plates 168 and 170 which are spring-biased in an inwardly or convergent direction. In this manner, upon retraction of the elevator platform 162, the group of five packages 50 will be retained by the upper edge of the plates 168 and 170. As will be appreciated from a perusal of FIGS. 16 and 17, a set of four upstanding brackets 172 support the plates 168 and 170 by means of the intermediate plates 174 and 174' each of which are adapted to mount at least a pair of hinges 176 which, in turn, are connected with the pivotal plates 168 and 170, as shown. The biasing of the plates 168 and 170 inwardly is accomplished by means of springs 178, two of which are provided for each plate and each of which are biased between the associated pivotal plate and the head of a stud 180 extending outwardly from the neighboring plate 174 or 174'. The movement of the pivotal plates 168 and 170 in an inward direction is limited by their respective engagements with companion plates 174 and 174'. In the disclosed embodiment, the elevator mechanism 54 will operate to elevate three rows of five packages before the upper two rows are fed into the lowered carton blank 46 by the plunger assembly 56.

*Assembly plunger reciprocation*

Turning now to the horizontally reciprocal plunger assembly 56, it will be appreciated that it is adapted to move in a forward direction to engage the upper two elevated rows of packages supported by the plates 168 and 170. The actuation of the plunger assembly 56 is dictated by the actuation of the micro-switch 182 engaged by the uppermost stack of packages supported by the pivotal plates 168 and 170. Upon actuation of the plunger assembly 56, a plunger plate 184 will engage the upper two rows of packages and feed them forwardly into the lowered carton blank 46 such that the leading ends of the packages engage the panel 60 of the blank 46. The plunger will continue its forward movement and, consequently, move the ten packages together with the engaged blank 46 through the carton folding bed station 58 and, more particularly, the opening 186 provided therein between plates 188 and 190. The plunger plate 184 will thereafter be retracted to its original starting position. The forward reciprocation and retraction of the plunger plate 184 is accomplished by means of the air cylinder assembly 192 from the forward end of which extends the piston rod 194 coupled directly with the plate.

Immediately upon retraction of the plate 184, another carton blank 46 will be lowered and the plunger assembly 56 will be poised and ready for its next reciprocatory cycle bearing in mind that the feeding of the packages 50 and the operation of the elevator mechanism 54 is still in process.

*Initial carton blank folding*

Figure 1:
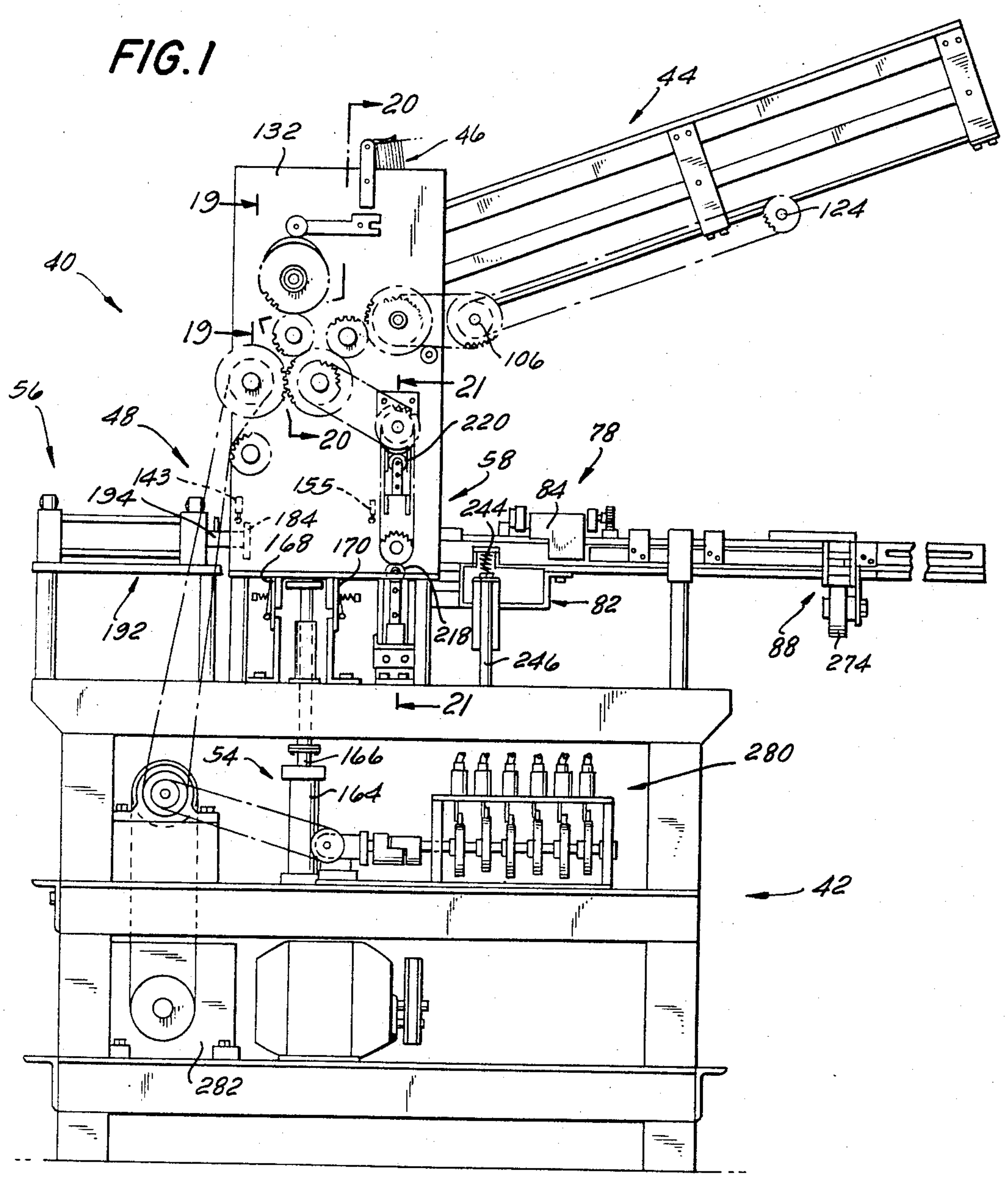
FIG. 1 is a side elevational view of the cartoning machine of this invention.
Figure 2:
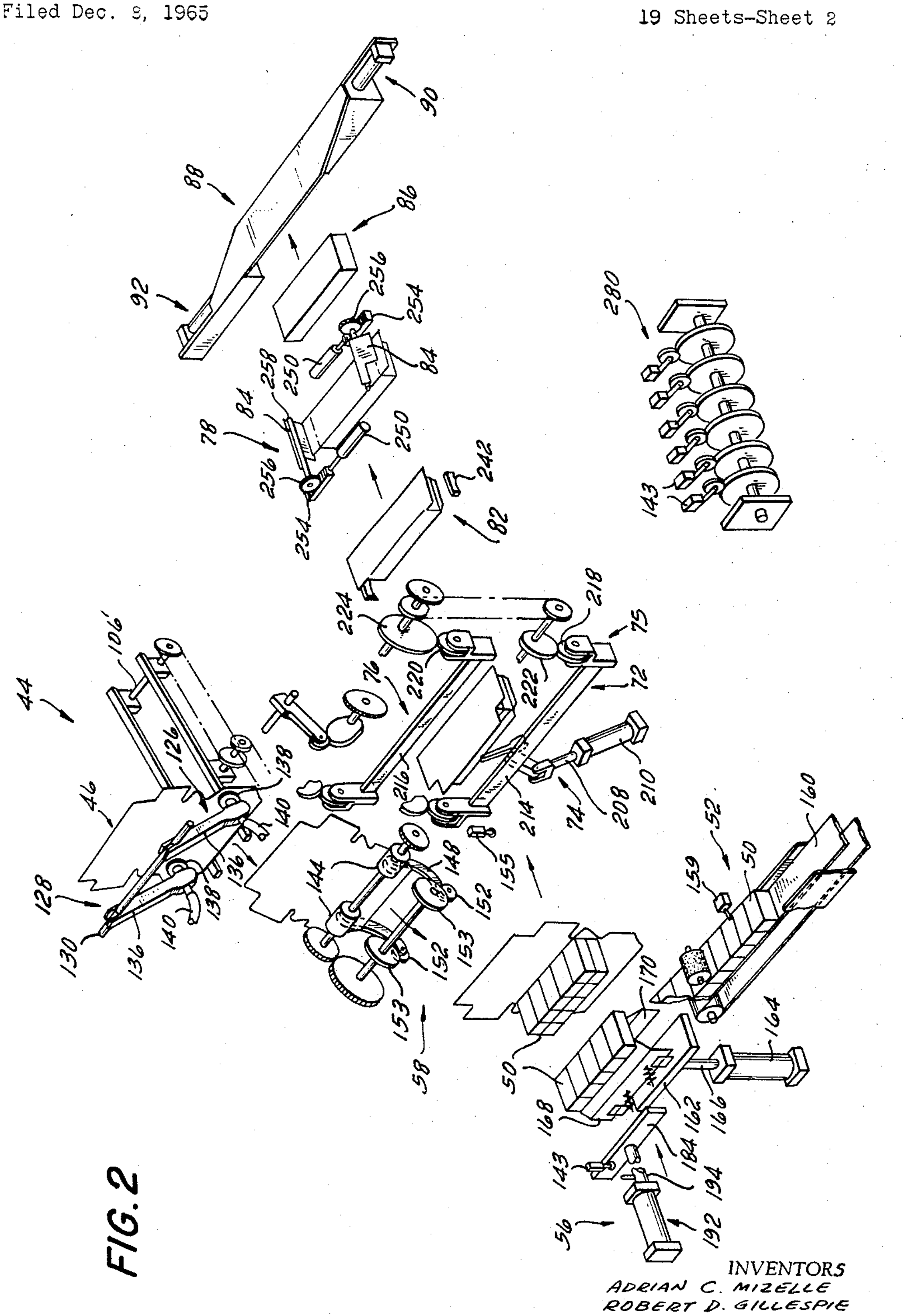
FIG. 2 is an exploded fragmentary and diagrammatic view illustrating the sequence of operations performed by the cartoning machine of this invention.
Figures 3, 4, 5:
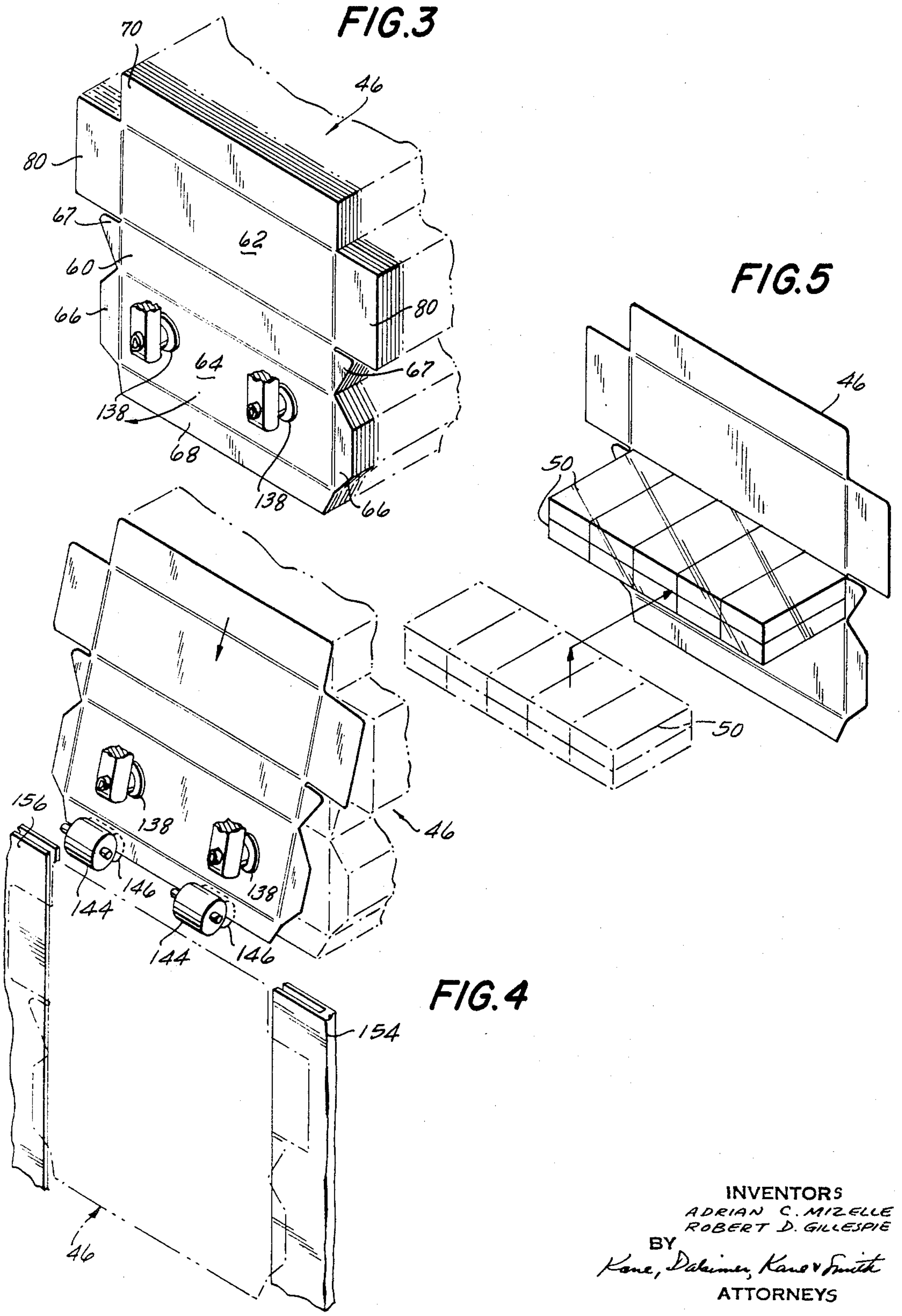
FIG. 3 is a diagrammatic and fragmentary view of the stacked carton blanks at the hopper station from which the blanks are lowered to the assembly station.
FIG. 4 is a similar diagrammatic and fragmentary view showing the lowering of the carton blanks one at a time to the assembly station.
FIG. 5 is a diagrammatic and fragmentary view showing the manner in which two rows of wrapped cigarette packages are plunged into the relatively flat carton blank during the assembly process.
Figures 6, 7, 8, 9, 10, 11:
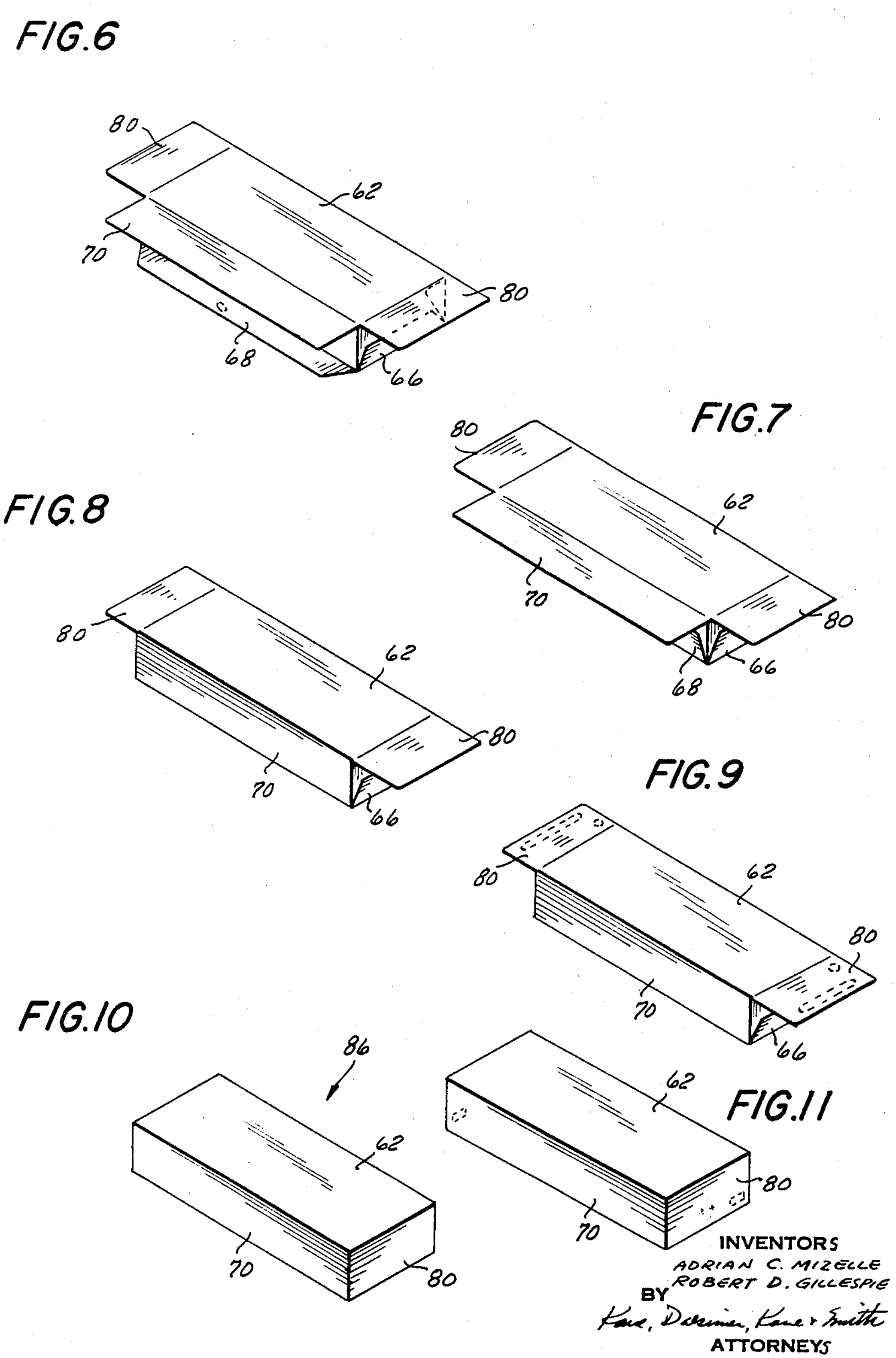
FIG. 6 is a diagrammatic view showing the manner in which the blank is initially folded about the packages with the bottom end flaps shown folded upwardly at this time.
FIG. 7 is another diagrammatic view showing the folding upwardly of the trailing side lower flap, following the application of paste to the exterior thereof.
FIG. 8 is a similar diagrammatic view showing the folding downwardly of the trailing side upper flap into engagement with the lower flap and securement thereto by means of the interposed adhesive.
FIG. 9 is a diagrammatic view showing in phantom the application of paste to the upper end flaps.
FIG. 10 is a similar view showing the manner in which the flaps are subsequently folded downwardly into engagement with the lower end flaps to form the complete carton of cigarettes.
FIG. 11 is a similar view showing the application of indicia to the carton ends denoting the selected date and other coded information.

As the group of ten packages and lowered carton blank 46 are driven between the plates 188 and 190 of the folding station 58, the carton top panel 62 will be folded downwardly upon the upper face of the group while the lower panel 64 will be folded upwardly into engagement with the lower face of the group of ten packages. The forward end flaps 67 will be folded rearwardly and, at the same time, the lower end flaps will be pivoted upwardly over the forward end flaps 67 in a manner depicted by FIG. 9 through the engagement of these lower flaps with the end flap folding plates 196 and 196'. The partially folded carton blank and contained group of ten packages will come to rest at the trailing side flap pasting and folding station 75.

*Trailing flap pasting*

At the trailing flap pasting and folding station 75, the pasting mechanism 198 is initially operated to apply a predetermined pattern of glue to the underside of the bottom flap 68. This occurs immediately upon the partially folded blank 46 and contained group of ten packages 50 coming to rest at the trailing side flap pasting and folding station 75. Towards this end, a paste pot 200 is conveniently mounted by the chassis 42 and is adapted to contain a suitable amount of the selected paste for adhering flaps 68 and 70 to one another. A rod-shaped applicator 202 is disposed over the pot 200 and is adapted to have its applicator head 204 be immersed into the contained paste and then retracted therefrom such that the head 204 applies a spot of paste to the outer face of the bottom flap 68. Towards this end, the applicator rod 202 is keyed to a shaft 206 suitably journaled at its ends for rotation. One of the shaft ends is keyed to arm 207 which, in turn, is pivotally connected with the outer free end of a piston rod 208 extending from air cylinder 210. Operation of this cylinder on signal will result in the desired patter nof paste being applied to the top side flap 70. This pattern need only be in the form of a circular spot.

*Trailing side flap folding*

Figure 21:
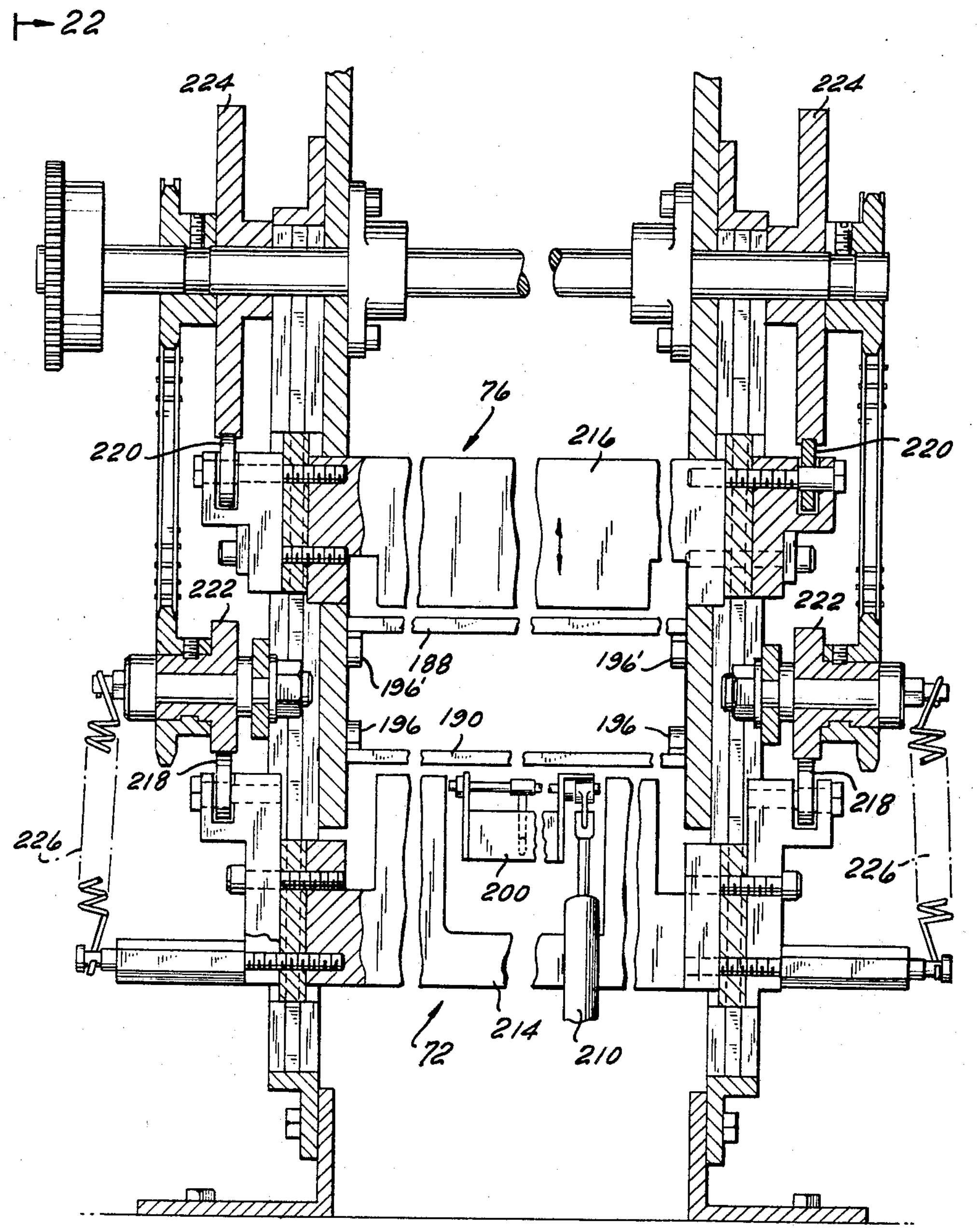
FIG. 21 is a sectional view taken along the line 21—21 of FIG. 1.
Figure 22:
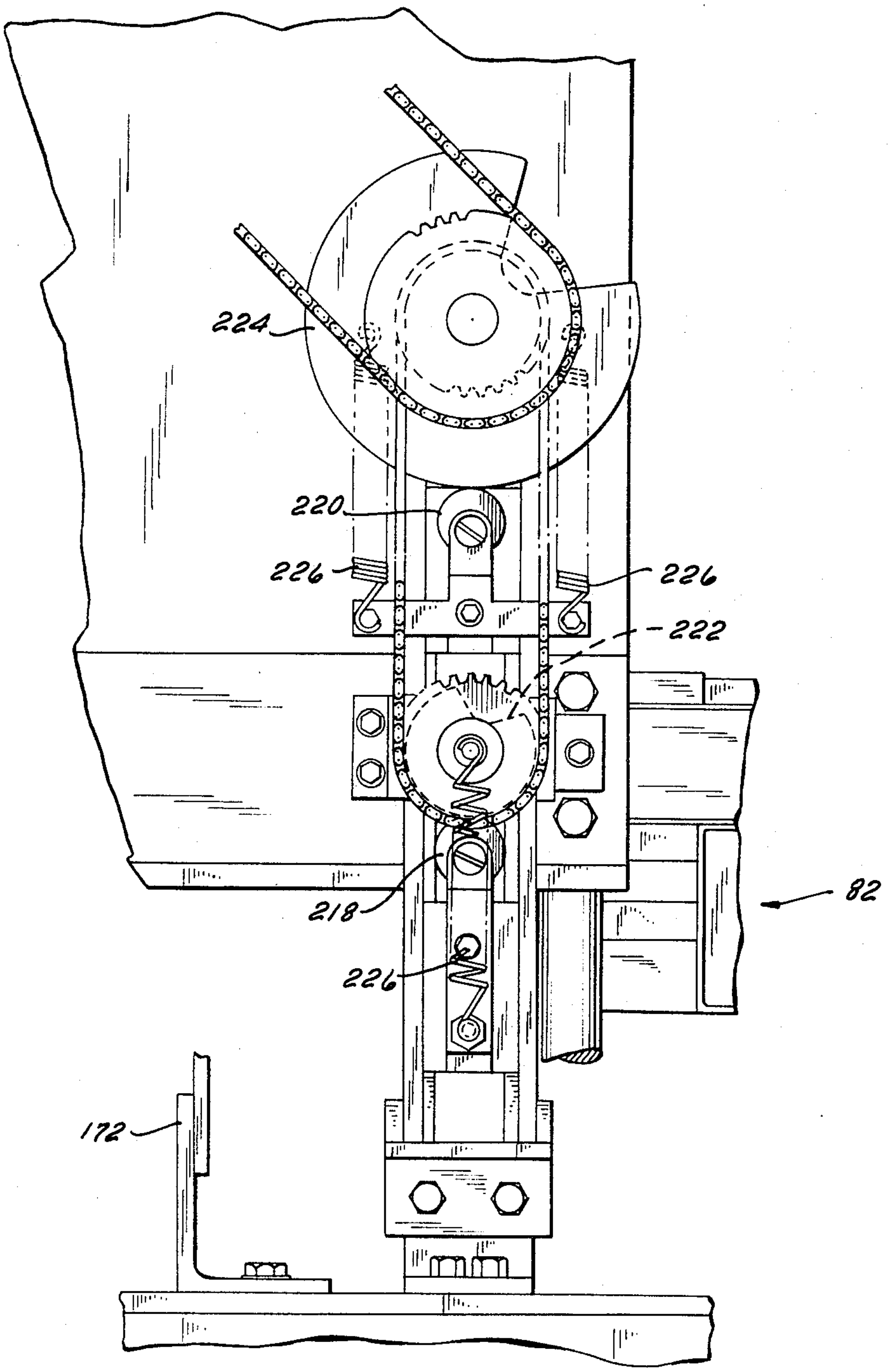
FIG. 22 is a fragmentary side elevational view taken along the line 22—22 of FIG. 21.
Figure 24:
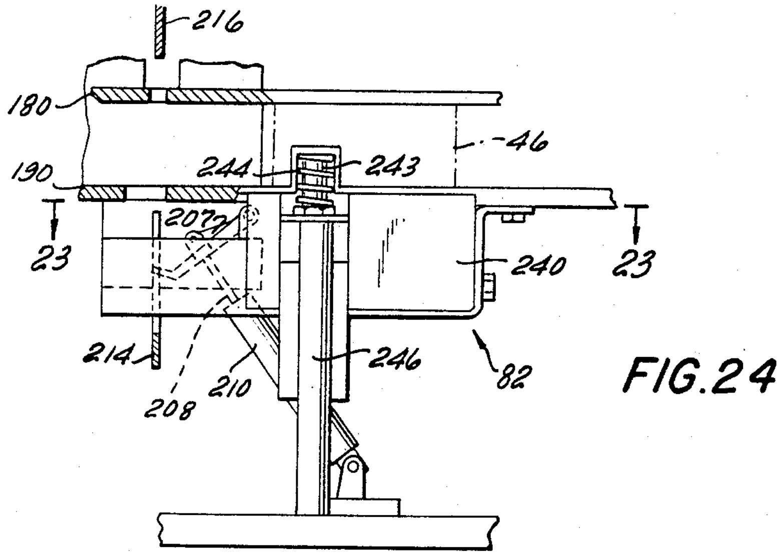
FIG. 24 is an enlarged fragmentary elevational view of the top end flap folder.
Figure 23:
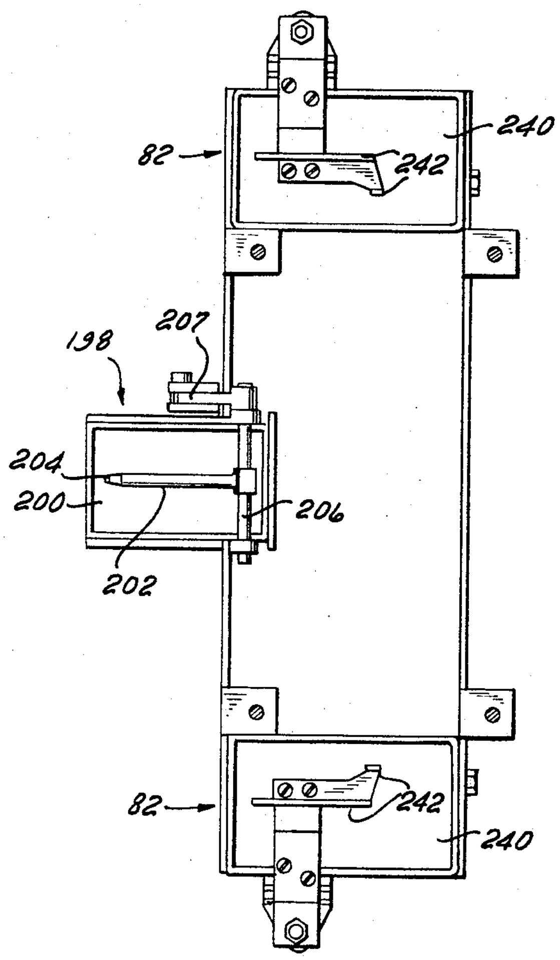
FIG. 23 is a top plan view of the trailing side bottom flap paster.
Figures 25, 26:
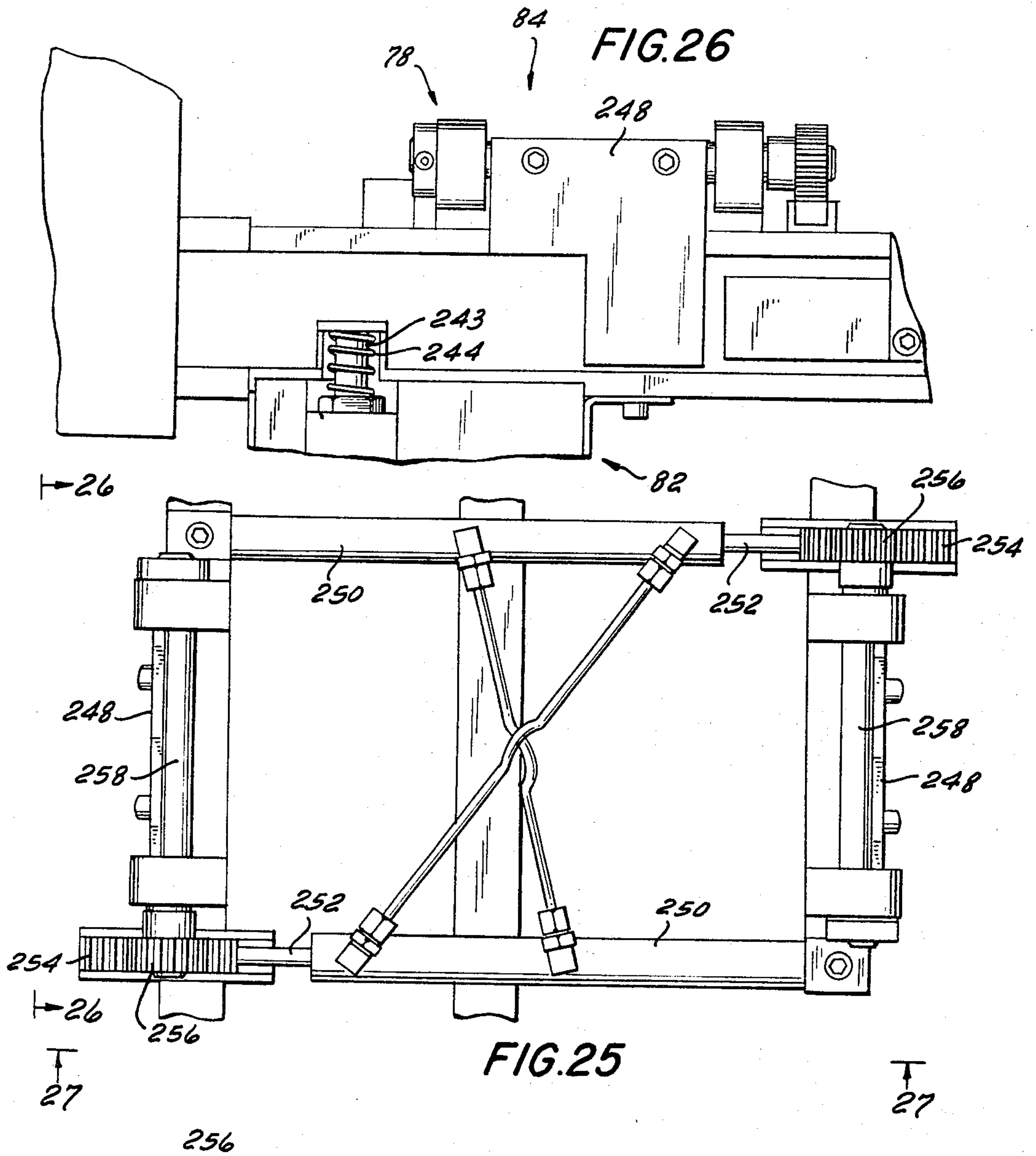
FIG. 25 is a fragmentary plan view of the top end flap pasting and folding station.
FIG. 26 is an elevational view taken along the line 26—26 of FIG. 25.
Figure 27:
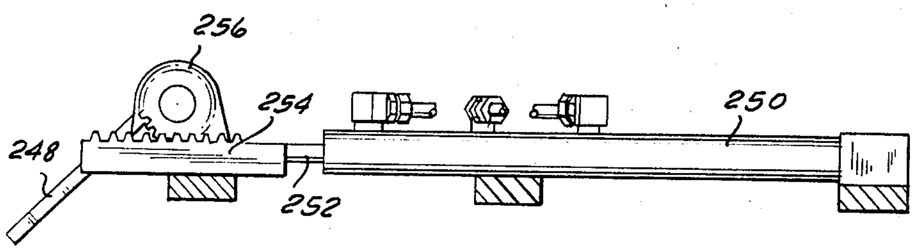
FIG. 27 is a side elevational view taken along the line 27—27 of FIG. 25.
Figure 28:
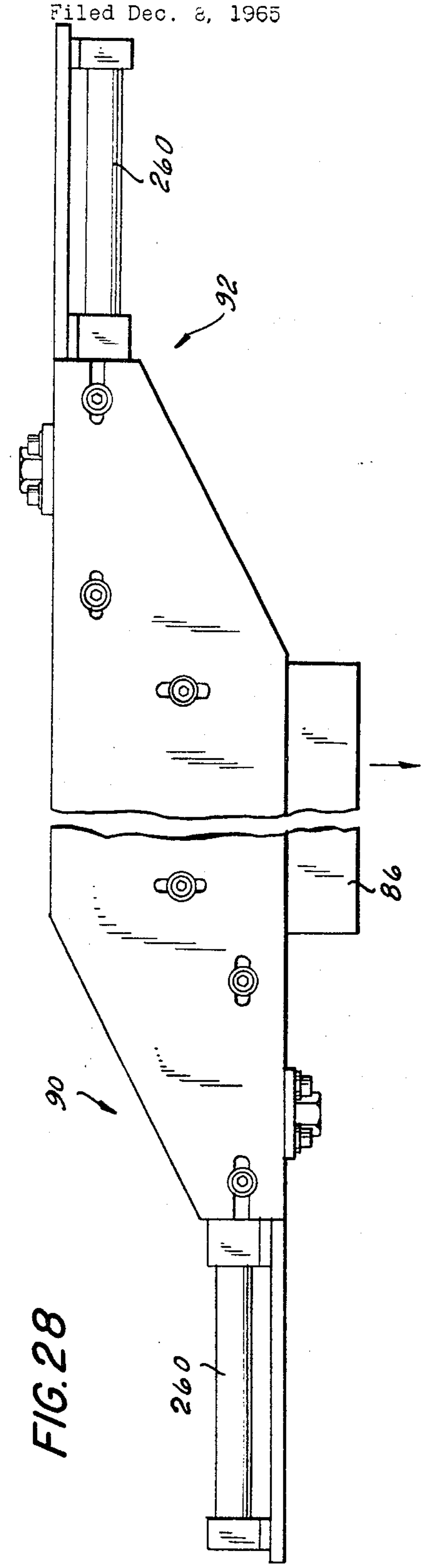
FIG. 28 is a top plan view of the code and date stamp station.
Figure 29:
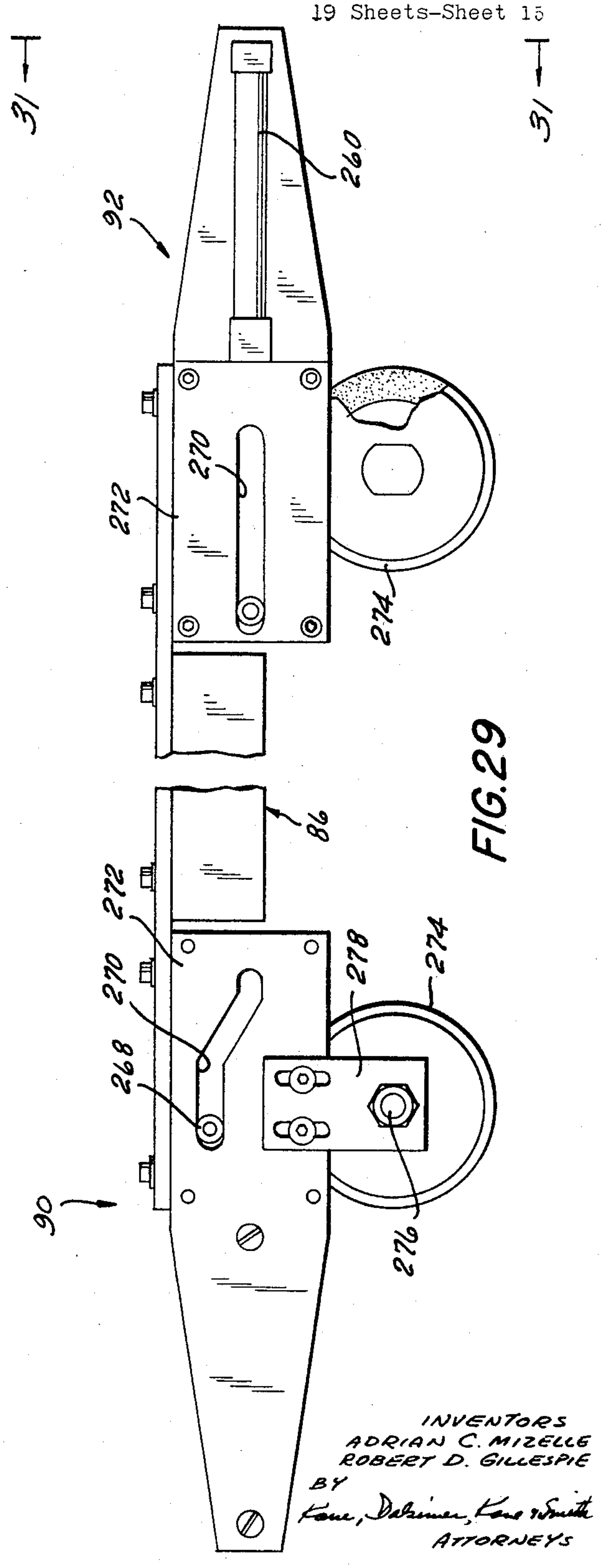
FIG. 29 is an end elevational view thereof.
Figure 30:
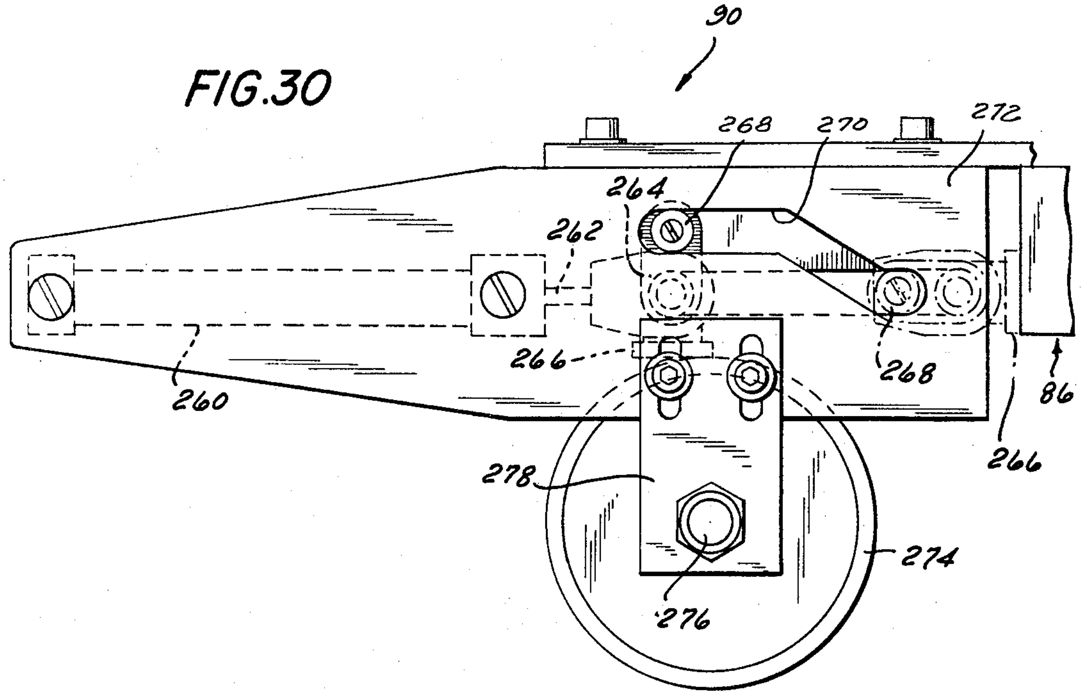
FIG. 30 is an enlarged fragmentary end elevational view of one of the code and date stamp sub-assemblies.

Immediately following the application of the paste spot by the applicator head 204, the trailing bottom flap 68 is folded upwardly and thereafter the trailing top flap 70 is folded downwardly to cause these flaps to be interconnected by means of the paste spot. Thus, the bottom trailing flap folding plate 214 is adapted to be shifted upwardly to have its top edge engage the bottom flap 68 and continue this movement until the flap is firmly against the trailing end of the group of ten packages. The top flap folding plate 216 is shifted upwardly while the lower plate 214 is shifted upwardly and will be moved downwardly when the lower plate 214 is retracted. These movements are synchronized with one another through a gear and sprocket timing arrangement. This synchronized movement is accomplished by the employment of structure illustrated clearly in FIGS. 21 and 22 wherein each plate is coupled with a guided slidable cam follower 218 and 220, respectively. These followers are biased against cams 222 and 224, both of which include interrupted surfaces. The recess of each surface is relatively disposed such that they are encountered by the respective cam followers and the associated folding plate will be elevated under the bias of associated springs 226. Undei these circumstances, the upper plate will remain in a lowered position after folding the top flap 70 downwardly to maintain the folded relationship between the flaps 68 and 70 and the interposed paste in contact with each until such time as the following partially folded carton 46 and contained packages 50 are fed into engagement therewith upon the next reciprocation of the plunger assembly 56. Immediately before the cartons are placed in abutting relationship, the upper plate 216 will be reciprocated upwardly. At such time as this abutting relationship is attained, the carton and contained packages will be shifted to the next plunge station. It should be understood that other synchronized means for raising and lowering plates 214 and 216 are contemplated including an arrangement of cam followers that engage with the tops of the associated cams.

*Top end flap pasting*

The end flap paster 82 is actuated during the retraction of the plunger assembly 56 to apply the desired pattern of paste to the top end flap 80. Each of the paster assemblies 82 includes a paste receptacle 240. A vertically reciprocal applicator 242 is disposed in associated receptacle 240 and when in a retracted position, is immersed in the contained adhesive. The applicator is connected with the upper end of a piston rod 243 biased in a retracted position by means of spring 244. The piston rod 243 extends from the air cylinder 246 suitably bracketed to the machine chassis 42. Upon actuation of air cylinder 246, the rod 212 is forced upwardly whereupon the applicator 242 with adhesive is extended upwardly into engagement with the inner face of the top end flap 80.

*Top end flap folding*

Following the application of the adhesive to the top end flaps 80, the partially folded carton 46 is moved to the top end flap folding station 78. At this station, each of the top end flaps 80 are folded downwardly by pivotal folding plates 248; and thereafter the folded top flaps are maintained in this position by the plates until such time as the reciprocal plunger assembly 56 is actuated again. The plates 248, under these circumstances, will be pivoted to a raised position at which they are disposed in a substantially horizontal plane. The pivotal movement of each plate 248 is obtained through the actuation of an associated air cylinder 250. When the piston rod 252 is fully extended, the associated flap 248 is disposed in its raised horizontal position through the cooperation of a rack 254 connected with the end of the piston rod 252 and pinion gear 256 keyed with the associated flap 248 and rotatable on the suitably journaled shaft 258. Upon retraction of the piston rod 252, the rack and pinion mechanism 254–256 will lower the folding plate 248 about the mounting shaft 258. It should be understood that a static or stationary folding mechanism may be substituted for the movable flap folding plate 248 for folding top end flap 80 downwardly.

*Coding and dating*

Figure 31:
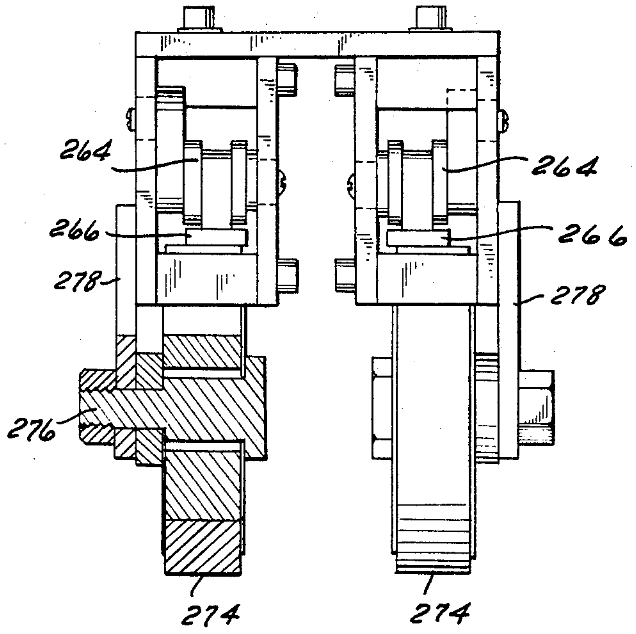
FIG. 31 is an end elevational view of the code and date stamp assembly taken along the line 31—31 of FIG. 29 with certain parts broken away and sectioned.
Figure 32:
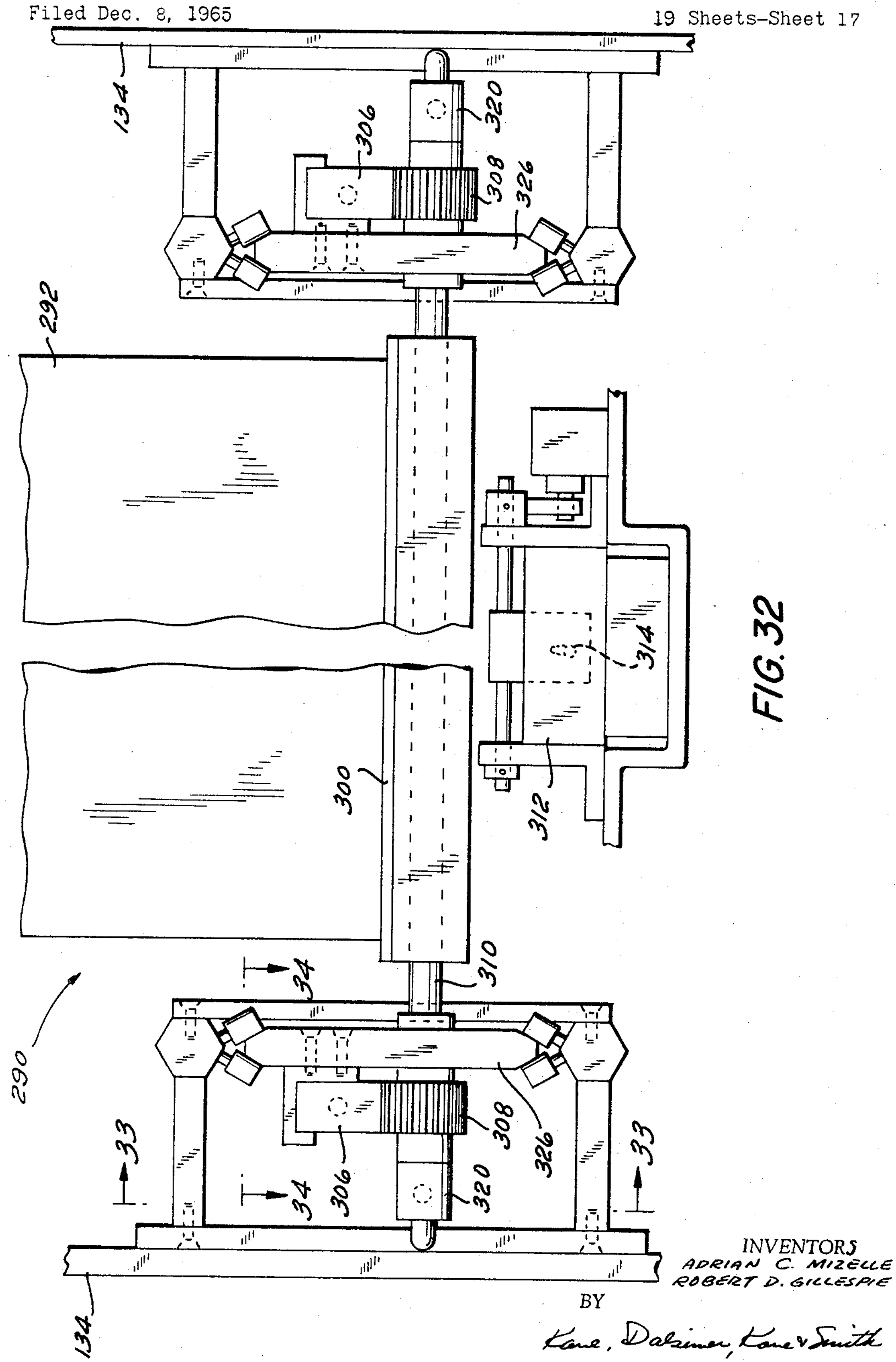
FIG. 32 is a fragmentary elevational view of a redemption coupon hopper and feeding assembly incorporated in the cartoning machine as an optional accessory.
Figure 33:
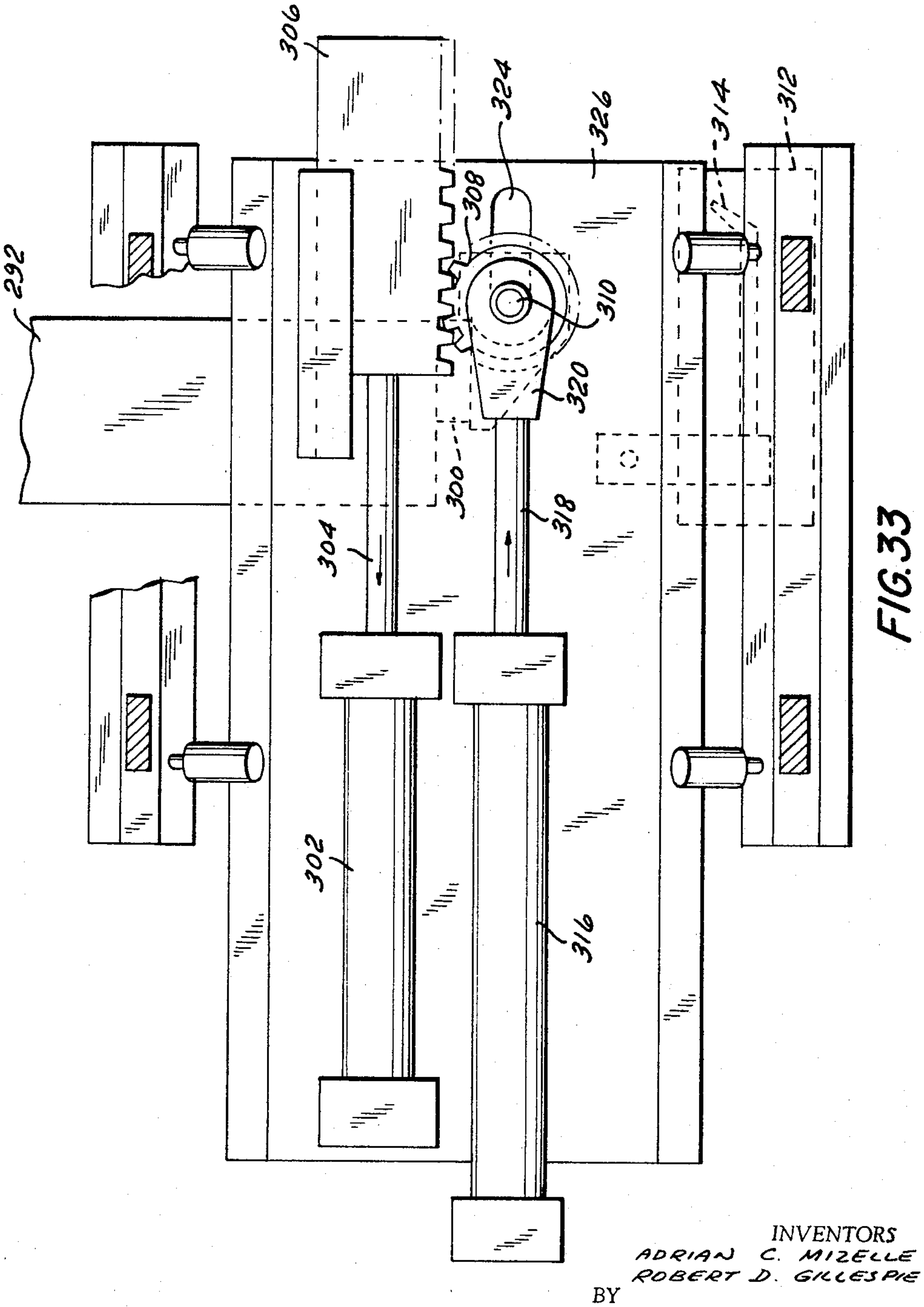
FIG. 33 is a sectional view taken along the line 33—33 of FIG. 32.

The now completely folded carton 46 and encased group of ten cigarette packages 50 arranged in two rows of five packages are shifted to the coding and dating station 88 either upon the next reciprocation of the plunger assembly 56 or after a predetermined number of such reciprocations as is contemplated by the illustrated embodiment. Thus, the coding and dating station 88 located downstream of the top end flap folding station 78 operates to apply a suitable code and/or date to the outer face of the top end flaps 80 of the carton. Towards this end, stamping mechanisms 90 and 92 operate to apply the selected indicia and information and each of these mechanisms is operated by the associated air cylinder 260 suitably bracketed to the machine chassis 42. The usual piston rod 262 extends from the air cylinder 260 and at its end pivotally mounts a link 264 which, in turn, has keyed to its other end a stamping head 266. A roller 268 at this connection is adapted to travel in slot 270 of the template plate 272. With this arrangement, the stamping head 266 is adapted to be disposed in a substantial vertical plane to apply indicia to the associated carton end flap 80 when the piston rod 262 is fully extended and the roller 268 is at the lower extremity of the slot 270. Upon retraction of the piston rod 262, the stamping head 266 is also retracted with the roller 268 following the slot 270 to the other extremity at which the link 264 pivots downwardly to thereby cause the stamping head 266 to be disposed in an essentially horizontal plane. In this position, the stamping head 266 is adapted to engage an ink applying roller 274 to receive thereon a suitable quantity of ink. This roller 274 is pivotal on a shaft 276 which, in turn, is journaled in a bracket 278. Each engagement of the stamping head 266 with the periphery of the roll 274 will cause a slight counterclockwise rotation of the roller 274, as viewed in FIG. 31, to thereby assure a fresh and adequate application of ink.

After the selected code and date has been applied to the carton top end flaps 80, the cartons may be removed from the cartoning machine 40 and suitably packaged for commercial shipment and distribution.

The timing and synchronization of the operation of the mechanisms at each of the stations determined by any one of a number of arrangements including the schematically illustrated timing gear network operating in conjunction with programming timing cam network 280. In this connection, as the plunger assembly 52 is retracted, a one revolution clutch 282 or similar mechanism is operated in accordance with the disclosed embodiment. This one revolution clutch starts the programming network 280 which controls all operations on the carton following the plunger retraction. The carton blank 46 feeding cycle is taken off of the one revolution clutch and the operation of the trailing side flap folders 72 and 76 is taken off of the one revolution clutch. The programming network may employ two cams for each operation; that is, one cam will initiate the operation, the other cam will stop the operation.

*Coupon feed*

In the event redemption coupons are to be placed in the carton 86 together with the ten cigarette packages 50, a coupon attachment 290 may also form an optional part of the cartoning machine 40 which will require minor modifications to accept this attachment. In this connection, a coupon hopper 292 is adapted to hold a supply of coupons 294. These coupons are properly held in position by spring clips 296 and knife edges 298 located at the bottom of the hopper 292. The knives permit one coupon 294 to be removed from the hopper 292 at a time by a vacuum pick-up in the form of a rubber pad 300. This pad is formed with a series of holes in its face connected to a suitable source of vacuum.

A typical feeding cycle for the coupons 294 is initiated when the plunger assembly 56 commences its forward movement. When this occurs, the air cylinder 302 is actuated thereby moving its piston rod 304 and attached rack to a retracted position. A pinion 308 meshed with the rack 306 is correspondingly rotated to cause rotation of the vacuum pick-up 300 both of which are keyed to shaft 310. In actual practice, the vacuum pick-up is rotated one-half revolution to thereby move the lowermost coupon from the hopper 292 to a glue applying position substantially over the glue reservoir 312. An air cylinder actuated dauber 314 ordinarily immersed in the glue in the pot 312 pivots upwardly to apply glue to the coupon at the glue applying position. Immediately thereafter, another air cylinder 316 is actuated to cause its piston 318 to be shifted outwardly. This piston rod is connected with the shaft 310 by means of the clevis 320. This movement rotates shaft 310 until the pinion 308 essentially reaches the end of rack 306. With the shaft 310 at the end of the opening 324, slide 326 is shifted by the movement of the piston rod 318 until the coupon in the glue applying position comes in contact with the forwardmost carton blank 46 at rest in the carton magazine hopper and feeding station 44. When this occurs, the cycle is reversed and the coupon pick-up mechanism returns to its starting position to thereby complete the cycle. The synchronization of the air cylinders for the dauber and coupon feed for gluing and application is controlled by the air cylinder programmer 280. Under these circumstances, each carton blank 46 lowered to the assembly station 48 will have the desired number of coupons secured thereto. Missing coupons or cartons for that matter are detected by means of an ultrasonic relay employing two sensing heads mounted just below the carton feed rolls. This unit is active only while the carton blank 46 is moving downward through the carton guide bars 154 and 156. On and off condition of the unit may be accomplished by means of a cam operated micro-switch (not shown). Each carton requiring a coupon 294 has a hole 330 located so that it will be covered by the coupon when it is in its proper position, a missing coupon will allow the ultrasonic unit relay to close, energizing a memory device which will operate to subsequently remove the carton missing a coupon. This function is performed while the cartons are at rest after the improper carton has passed coding and dating station 88 by a suitable reject mechanism. For example, the memory device may include a memory wheel or timer and the reject mechanism may include a piston operated unit.

*Summary*

In summary, the above cycle of operation and handling of wrapped cigarette packages and carton blanks is repeated in accordance with the timed sequence. Thus, the wrapped cigarette packages 50 continue to be fed to the elevator assembly 54 where groups of five packages 50 elevated as the leading pack of each group trips switch 163. When the third group of five packages is thus raised and thereafter supported by means of the arms 168 and 170 of the elevator assembly 54, switch 182 is actuated by the upper face of the first package 50 of the top row. Thereafter, the plunger assembly 56 is actuated to feed the top two groups of packages into the lowered carton blank 46 supported at the assembly station 48. The plunger assembly 56 will continue to feed the ten packages and the carton blank into the initial folding station at which time the carton blank top panel 62 and bottom panel 64 will be folded into engagement with the top face of the upper row of packages and the bottom face of the lower row of packages, respectively, while the leading end of the packages is engaged with the carton front panel 60. Folding plates at this station will force the carton lower end flaps 66 upwardly and front end flaps 67 rearwardly. The bottom trailing side flap 68 will now receive a spot of glue through the actuation of the top trailing side flap paster 74. Immediately thereafter, the trailing flap folding assemblies 72 and 76, respectively, fold the bottom trailing flap 68 and top trailing flap 70 into engagement with one another about the trailing end of the enclosed cigarette package 50. The next actuation of the plunger assembly will place the carton at the second plunge station. During retraction of the plunger assembly 56, the top end pasting mechanism 82 is actuated to apply a spot of glue to the underface of the top end flaps 80. The next reciprocation of the plunger assembly 56 will place the partially enclosed cigarette packages at the following downstream or third plunge station at which the top end folding mechanism 84 operates to fold the top end flaps 80 downwardly into engagement with the already folded lower end flaps 66. Following a predetermined number of further reciprocations of the plunger assembly 56, the code and dating station 88 is reached at which the stamping mechanisms 90 and 92 apply the selected indicia. The cartons are then fully folded and the enclosed packages suitably encased and ready to be shipped and distributed commercially.

Thus, the several aforenoted objects and advantages are most effectively attained. Although a single somewhat preferred embodiment has been disclosed and described in detail herein, it should be understood that this invention is in no sense limited thereby but is to be determined by the scope of the appended claims.

We claim:

1. A cartoning machine for enclosing a predetermined number of packages arranged in rows in a carton comprising:

a support;

a hopper on said support for supporting and supplying substantially flat carton blanks in stacked relationship, said blanks each having a leading panel, integral top and bottom panels, integral top and bottom end panels and integral top and bottom trailing flaps;

a package feeder means part of which is on said support for receiving and feeding packages;

a carton blank feeding means on the support for feeding a carton blank from the hopper to an initial location at which packages are assembled therewith;

blank support means on the support at said location for supporting a carton blank at said location;

an elevator means on the support for receiving a predetermined number of packages in a row and elevating said row to an elevated position;

package support means on said support for supporting elevated rows of packages;

plunger means on said support for moving a group of said packages constituting at least one elevated row of packages from said package support means into engagement with the carton blank at said initial location on the blank support means and then moving the engaged group and blank horizontally along a predetermined longitudinal axis and path of travel to a first location at which the blank is partially enclosed about the group;

folding means for cooperating with the blank moving from said initial location to the first location such that the blank has the leading panel over one end of the group, the top and bottom panels over the respective top and bottom faces of the group, and the bottom end flaps over part of the ends of the group, said blank having the trailing top and bottom flaps and top end flaps in an extending position;

trailing flap pasting means on the support for applying a predetermined pattern of paste to one of the trailing flaps;

trailing flap folding means on the support for folding the trailing flaps upon one another with the pattern of paste therebetween, trailing flap folding means being automatically operated to fold the trailing flaps while the partially assembled packages and blank are at the first location, the trailing flap folding means including a pair of vertically reciprocal folding plates adapted to move from a first position away from the respective trailing flaps towards one another to a second position into engagement with the respective trailing flaps to fold the trailing flaps upon one another with the pattern of paste therebetween, means for actuating the trailing flap folding plates linearly between the first and second positions and to maintain the plates at the second position to maintain the folded relationship between the trailing flaps with the pattern of paste therebetween until another carton blank partially enclosing a group of packages is moved by the plunger means from the initial location at which time the trailing flap folding plates are reciprocated away from one another and the trailing flaps and the lead panel of said another partially enclosing carton blank is moved into engagement with the folded trailing flaps and moved to the first location by the plunger means;

end flap pasting means on the support for applying a further predetermined pattern of paste to the top end flaps;

end flap folding means on the support for completing the folding of the carton by securing the end flaps by means of said further pattern of paste;

and means for directing the partially enclosing blank in-line and along said predetermined longitudinal axis and path of travel from location to location with each movement of the plunger means to complete the folding and assembly of the carton about the group of packages.

2. The invention in accordance with claim 1 wherein said hopper includes an agitation assembly for agitating the stacked blanks for maintaining the stacked relationship of the blanks in the hopper.

3. The invention in accordance with claim 1 wherein the carton blank feeding means comprises a suction cup assembly for engaging a single blank in the hopper at a time and remove such blank from said hopper, and roller means for receiving the blank removed from the hopper by the suction cup means.

4. The invention in accordance with claim 3 wherein drive means synchronized with the operation of the plunger means drives the roller means to feed the blank to the support means.

5. The invention in accordance with claim 1 wherein said support means includes a pair of spaced plates biased towards one another and outwardly pivotal with respect to one another, said elevator means being so constructed and arranged to elevate each row of packages between said plates to pivot the plates outwardly and upon return of said elevator said plates are adapted to pivot inwardly to engage the underside of the elevated row of packages and support the row thereon.

6. The invention in accordance with claim 1 wherein drive means are provided for said plunger means operable upon the elevation of a predetermined number of rows of packages and synchronized with the operation of said elevator means.

7. The invention in accordance with claim 1 wherein coupon feeding means are on said support for feeding and coupling a coupon to each blank as it is fed from the hopper.

8. The invention in accordance with claim 1 wherein the trailing flap pasting means is automatically operated to apply the predetermined pattern of paste to the trailing bottom flap upon delivery of the partially assembled packages and blank to the first location.

9. The invention in accordance with claim 8 wherein the trailing flap folding means is automatically operated to fold the trailing flaps following the application of the predetermined pattern of paste to the trailing bottom flap while the partially assembled packages and blank are at the first location.

10. The invention in accordance with claim 1 wherein said end flap pasting means is at a second location and means on said support cooperates in feeding the partially assembled packages and blank from the first location to the second location.

11. The invention in accordance with claim 10 wherein the end flap folding means is at a third location and means on said support cooperates in feeding the partially essembled packages and blank from the second location to the third location.

12. The invention in accordance with claim 11 wherein an indicia applying means is at a fourth location for applying selected indicia to the completely folded carton and means for cooperating in feeding the completely folded carton from the third location to the fourth location.

13. A cartoning machine for enclosing a predetermined number of packages arranged in rows in a carton comprising:

a support;

a hopper on said support for supporting and supplying substantially flat carton blanks in stacked relationship;

a package feeder means part of which is on said support for receiving and feeding packages;

a carton blank feeding means on the support for feeding a carton blank from the hopper to an initial location at which packages are assembled therewith;

blank support means on the support at said location for supporting a carton blank at said location;

an elevator means on the support for receiving a predetermined number of packages in a row and elevating said row to an elevated position;

package support means on said support for supporting elevated rows of packages;

plunger means on said support for moving a group of said packages constituting at least one elevated row of packages from said package support means into engagement with the carton blank at said initial location on the blank support means and then moving the engaged group and blank horizontally along a predetermined longitudinal axis and path of travel to a first location at which the blank is partially enclosed about the group;

the blank having a leading panel over one end of the group, top and bottom panels over the respective top and bottom faces of the group, and bottom end flaps over part of the ends of the group, said blank having extending trailing top and bottom flaps and extending top end flaps;

trailing flap pasting means on the support for applying a predetermined pattern of paste to one of the trailing flaps;

trailing flap folding means on the support for folding the trailing flaps upon one another with the pattern of paste therebetween, trailing flap folding means being automatically operated to fold the trailing flaps while the partially assembled packages and blank are at the first location, said end flap pasting means is at a second location and means on said support cooperates in feeding the partially assembled packages and blank from the first location to the second location;

end flap pasting means on the support for applying a further predetermined pattern of paste to the top end flaps;

end flap folding means on the support for completing the folding of the carton by securing the end flaps by means of said further pattern of paste;

coupon feeding means being on said support for feeding and coupling a coupon to each blank as it is fed from the hopper, and a missing coupon detector means for detecting a missing coupon on a blank for permitting subsequent removal of the carton having the missing coupon.

References Cited

UNITED STATES PATENTS

| | | | |
|---|---|---|---|
| 2,136,897 | 11/1938 | Thayer | 53—131 X |
| 2,259,866 | 10/1941 | Stokes | 53—137 X |
| 2,609,646 | 9/1952 | Total | 53—230 |
| 2,968,901 | 1/1961 | Johnson | 53—230 |
| 3,225,512 | 12/1965 | Bulger et al. | 53—159 |
| 3,259,384 | 7/1966 | Hittenberger | 271—62 |
| 3,285,604 | 11/1966 | Parker | 271—62 |

FOREIGN PATENTS

| | | |
|---|---|---|
| 841,288 | 7/1960 | Great Britain. |
| 856,344 | 12/1960 | Great Britain. |

WILLIAM W. DYER, Jr., *Primary Examiner.*

N. ABRAMS, *Assistant Examiner.*